United States Patent
Nguyen et al.

(10) Patent No.: US 10,047,281 B2
(45) Date of Patent: Aug. 14, 2018

(54) FORMING PROPPANT PACKS HAVING PROPPANT-FREE CHANNELS THEREIN IN SUBTERRANEAN FORMATION FRACTURES

(71) Applicant: Halliburton Energy Services, Inc., Houston, TX (US)

(72) Inventors: Philip D. Nguyen, Houston, TX (US); Denise Benoit, Houston, TX (US); Gladys Rocio Montenegro-Galindo, Kingwood, TX (US); Yuming Yang, Houston, TX (US); Zheng Lu, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/555,950

(22) PCT Filed: Apr. 6, 2015

(86) PCT No.: PCT/US2015/024530
§ 371 (c)(1),
(2) Date: Sep. 5, 2017

(87) PCT Pub. No.: WO2016/163983
PCT Pub. Date: Oct. 13, 2016

(65) Prior Publication Data
US 2018/0044577 A1    Feb. 15, 2018

(51) Int. Cl.
*E21B 43/267*    (2006.01)
*C09K 8/60*    (2006.01)
(Continued)

(52) U.S. Cl.
CPC .............. *C09K 8/805* (2013.01); *C09K 8/64* (2013.01); *C09K 8/66* (2013.01); *C09K 8/703* (2013.01);
(Continued)

(58) Field of Classification Search
CPC ...... E21B 43/26; E21B 43/267; E21B 33/138; E21B 43/2405; E21B 43/261;
(Continued)

(56) References Cited

U.S. PATENT DOCUMENTS 7,281,581 B2    10/2007 Nguyen et al.
7,581,590 B2    9/2009 Lesko et al.
(Continued)

OTHER PUBLICATIONS

International Search Report and Written Opinion from PCT/US2015/024530, dated Dec. 1, 2015, 17 pages.
(Continued)

*Primary Examiner* — Zakiya W Bates
(74) *Attorney, Agent, or Firm* — McDermott Will & Emery LLP

(57) ABSTRACT

Methods including pumping a fracturing fluid into a subterranean formation through an annulus between the subterranean formation and a pipe conveyance at a rate above a fracture gradient of the subterranean formation to create and/or open at least one fracture in the subterranean formation; continuously pumping a proppant-free fluid into the subterranean formation through the annulus at a first rate to extend the open fracture; continuously pumping a proppant fluid through an interior of the pipe conveyance and out the exit of the interior of the pipe conveyance at a second rate that is less than the first rate; and placing the proppant particulates into a portion of a fracture in the subterranean formation so as to form a proppant pack having proppant-free channels therein.

20 Claims, 2 Drawing Sheets

(51) Int. Cl.
*C09K 8/80* (2006.01)
*C09K 8/70* (2006.01)
*C09K 8/64* (2006.01)
*C09K 8/66* (2006.01)

(52) U.S. Cl.
CPC ............ *C09K 8/706* (2013.01); *E21B 43/267* (2013.01); *C09K 2208/10* (2013.01)

(58) Field of Classification Search
CPC . C09K 8/685; C09K 8/68; C09K 8/62; C09K 8/70; C09K 2208/26; C09K 8/64; C09K 8/703
See application file for complete search history.

(56) References Cited

U.S. PATENT DOCUMENTS

| | | |
|---|---|---|
| 7,681,635 B2 | 3/2010 | Farabee et al. |
| 8,066,068 B2 | 11/2011 | Lesko et al. |
| 8,479,816 B2 | 7/2013 | Lesko |
| 8,490,700 B2 | 7/2013 | Lesko et al. |
| 8,584,755 B2 | 11/2013 | Willberg et al. |
| 8,636,065 B2 | 1/2014 | Lesko et al. |
| 8,757,259 B2 | 6/2014 | Lesko et al. |
| 8,763,699 B2 | 7/2014 | Medvedev et al. |
| 2005/0016732 A1 | 1/2005 | Brannon et al. |
| 2010/0197528 A1 | 8/2010 | Sanders et al. |
| 2010/0282464 A1 | 11/2010 | Medvedev et al. |
| 2011/0083849 A1 | 4/2011 | Medvedev et al. |
| 2012/0111565 A1 | 5/2012 | Garcia-Lopez De Victoria et al. |
| 2013/0056213 A1 | 3/2013 | Medvedev et al. |
| 2013/0161003 A1 | 6/2013 | Makarychev-Mikhailov et al. |
| 2014/0374093 A1 | 12/2014 | Nguyen et al. |

OTHER PUBLICATIONS

Nguyen, et al., "Evaluation of Low-Quality Sand for Proppant-Free Channel Fracturing Method," Dec. 2014, International Petroleum Technology Conference, Abstract retrieved from https://doi.org.10.2523/IPTC-17937-MS, 2 pages.

FORMING PROPPANT PACKS HAVING PROPPANT-FREE CHANNELS THEREIN IN SUBTERRANEAN FORMATION FRACTURES

BACKGROUND

The embodiments herein relate generally to subterranean formation operations and, more particularly, to forming proppant packs having proppant-free channels therein in subterranean formation fractures.

Subterranean wells (e.g., hydrocarbon producing wells) are often stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids are then deposited in the fractures. These particulate solids, or "proppant particulates" or "proppant," serve to prevent the fractures from fully closing once the hydraulic pressure is removed by forming a proppant pack. As used herein, the term "proppant pack" refers to a collection of proppant particulates in a fracture. By keeping the fracture from fully closing, the proppant particulates aid in forming conductive paths through which fluids may flow.

The degree of success of a fracturing operation depends, at least in part, upon fracture porosity and conductivity once the fracturing operation is stopped and production is begun. The porosity and conductivity of a proppant pack is thus related to the interconnected interstitial spaces between the abutting proppant particulates in the proppant pack, and, accordingly, closely related to the strength of the placed proppant (e.g., if the placed proppant crushes, then the pieces of broken proppant may plug the interstitial spaces) and the size and shape of the placed proppant (e.g., more spherical proppant particulates generally yield increased interstitial spaces between the particulates).

When fractures close upon a proppant pack upon removal of hydraulic pressure, the fractures may crush or compact the proppant particulates, potentially forming non-permeable or low permeability masses within the fracture, rather than desirable high permeability masses. Such low permeability masses may choke the flow path of the fluids within the formation. Furthermore, the proppant particulates may become embedded in particularly soft formations, negatively impacting production.

One way to increase conductivity of proppant packs involves the placement of proppant aggregates comprised of multiple individual proppant particulates. The larger size of the proppant aggregates allows a reduced volume of proppant to be placed into the fracture while maintaining the structural integrity required to keep the fracture from closing and crushing the proppant aggregates. Accordingly, the spaces between the proppant aggregates through which produced fluids flow may be larger than the interstitial spaces that would be present between individual proppant particulates. Typical proppant aggregates are formed by agglomerating proppant particulates using a resin or tackifying agent that may, or may not, remain tacky after the aggregates have formed.

Another method proposed to increase the conductivity of proppant packs is to pump a substantially solids free fluid intermittently between pumping proppant particulates. The solids free fluid forms spaces within the proppant pack by preventing individual proppant particulates from gathering particularly close to one another. These spaces, or "proppant free channels," form conductive channels through which produced fluids may flow. Such intermittent pumping may be deleterious to operational equipment, as it requires the constant turning on and off of the equipment. Additionally, the intermittent pumping may cause additives in either the solids free fluid or other treatment fluids to settle out during the constant pressure changes (i.e., as the pumping equipment is stopped and begun again) and/or deposition of the additives in undesired locations in the subterranean formation.

BRIEF DESCRIPTION OF THE DRAWINGS

The following figure is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
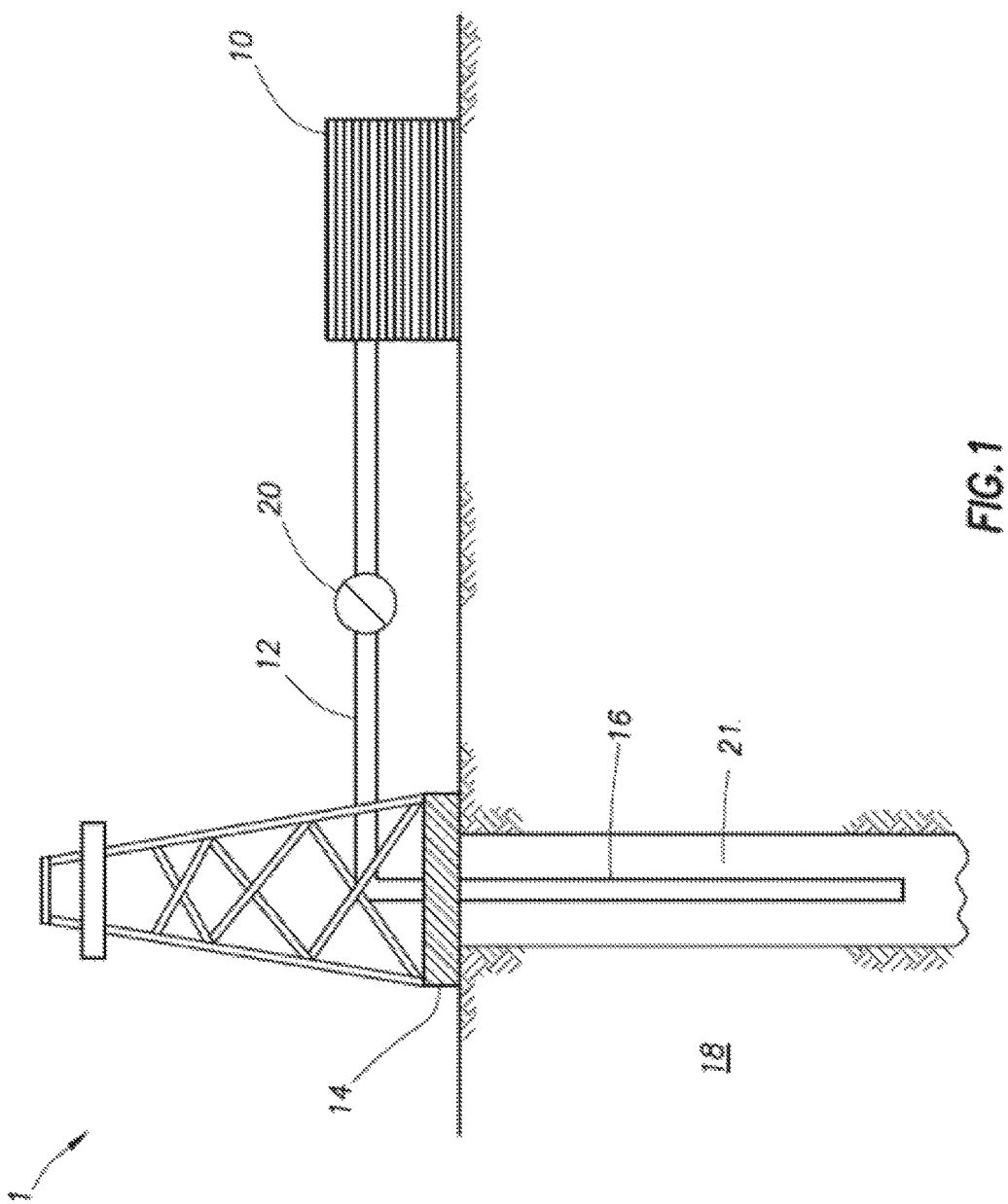
FIG. 1 depicts an embodiment of a system configured for delivering various fluids of the embodiments described herein to a downhole location.

The embodiments herein relate generally to subterranean formation operations and, more particularly, to forming proppant packs having proppant-free channels therein in subterranean formation fractures. Specifically, the embodiments herein relate to utilizing continuous pumping of two immiscible fluids, a proppant fluid and a proppant-free fluid, flowing at different pump rates to generate proppant-free channels in a subterranean formation fracture. As used herein, the term "proppant-free channels" refers to void or substantially void interconnected areas within a fracture. Such proppant-free channels may be capable of communicating fluids from the subterranean formation and into a wellbore for production. In some embodiments described herein, the proppant-free channels are formed from pumping the proppant-free fluids of the present disclosure and after flowback of the proppant-free fluid leaving such interconnected areas empty; the channels are defined along their edges by surrounding proppant packs formed from the proppant particulates in the proppant fluid.

The methods of the present disclosure do not depend on intermittent pumping of dual fluids to produce proppant-free channels. Instead, the methods described herein employ simultaneous, continuous pumping of immiscible proppant fluid and proppant-free fluid either through an annulus between a pipe conveyance and the subterranean formation, or the interior of the pipe conveyance itself. Accordingly, the methods described herein may reduce costs, for example, by maintaining proppant particulates together in discrete aggregates even without the use of a consolidating agent, although such consolidating agents may be used without departing from the scope of the present disclosure, and by minimizing wear and tear on pumping equipment (e.g., by eliminating the turning off and on of the pumping equipment). Moreover, the methods of the present disclosure allow an operator to use varying pumping rates of the proppant fluid and the proppant-free fluid to control the size of the discrete aggregates of the proppant particulates that are formed. Accordingly, the aggregates may be customized for the geometry of the fracture and/or the subterranean formation being treated, the type and size of proppant particulates utilized, the location of the fracturing operation in the subterranean formation, and the like.

In some embodiments, the methods and compositions described herein may be with reference to a hydraulic fracturing operation. However, the methods described herein may be used in any other subterranean formation operation that may benefit from the formation of a particulate pack having particulate-free channels therein. Such subterranean formation operations may include, but are not limited to, a stimulation operation, an acid-fracturing operation, a frac-packing operation, and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

In some embodiments, the present disclosure provides a method of introducing a pipe conveyance into a subterranean formation (e.g., into a wellbore). The pipe conveyance may comprise an interior and an exterior, where the interior form a fluid conduit through which fluids may flow into and out an exit of the pipe conveyance. The exit of the pipe conveyance may be simply an opening at the end of the pipe conveyance tubular, such as an opening without a coupling or attachment to a nozzle. The pipe conveyance positioned in the subterranean formation may form an annulus between the exterior of the pipe conveyance and the wall or surface subterranean formation, also forming a fluid conduit through which fluids may flow. The pipe conveyance may be any tubular capable of use in a subterranean formation environment. Suitable examples of pipe conveyances for use in the embodiments of the present disclosure may include, but are not limited to, tubing, coiled tubing, jointed tubing, jointed pipe, and the like, and any combination thereof. The flow rate of the proppant-free fluid traveling through the annulus is substantially larger compared to the proppant fluid traveling through the pipe conveyance. Once exited from the pipe, the proppant fluid is sheared off by the proppant-free fluid to form aggregated proppant particulates, as described in detail below.

A fracturing fluid comprising a first base fluid and a first gelling agent may be pumped into the subterranean formation through the annulus between the pipe conveyance and the subterranean formation at a rate and pressure above the fracture gradient of the formation to create and/or open at least one fracture therein. That is, the fracturing fluid may create one or more new fractures, and/or may open one or more existing fractures that are either naturally occurring, or present as a result of a previously performed fracturing operation, without departing from the scope of the present disclosure. As used herein, the term "fracture gradient" refers to the pressure required to induce fractures in a subterranean formation. The fracture gradient may depend on the particular type of formation composition at a particular location, depth location, and the like. A proppant-free fluid and a proppant fluid may then be continuously, simultaneously pumped into the subterranean formation at different rates to form a proppant pack having proppant-free channels therein. As used herein, the term "proppant-free fluid" refers to a fluid that is formulated to have no proppant particulates or other solids. As explained below, it will be appreciated that during operation according to the methods of the present disclosure, the proppant-free fluid may come into contact with an unknown, but minimal concentration of solids (e.g., formation fines, equipment solids, and the like), without departing from the scope of the present disclosure. Nevertheless, the proppant-free fluid is not formulated to include any such solids prior to its use in the methods described herein.

The proppant-free fluid may comprise a second base fluid and a second gelling agent; and the proppant fluid may comprise a third base fluid, a third gelling agent, and proppant particulates. The proppant-free fluid and the proppant fluid may be considered "substantially immiscible" so long as no more than about 5% (or no more than about 4%, 3%, 2%, 1%, or 0%) of the combined volume of the proppant-free fluid and the proppant fluid are miscible. The immiscibility of the proppant-free fluid and the proppant fluid, as described in detail below, is to mitigate dispersion or blending of two fluids and, in particular, to mitigate dispersion or blending of the proppant fluid into the proppant-free fluid. In some embodiments, the substantially immiscible quality of the proppant-free fluid and the proppant fluid may be achieved by using a hydrophobic proppant-free fluid and a hydrophilic proppant fluid, or a hydrophobic proppant fluid and a hydrophilic proppant-free fluid. In other embodiments, the substantially immiscible quality of the proppant-free fluid and proppant fluid may be achieved by utilizing two different base fluids in the proppant-free and proppant fluid that are substantially immiscible, such as an aqueous base fluid and an oil base fluid, as discussed in greater detail below.

In some embodiments, the substantially immiscible quality of the proppant-free fluid and the proppant fluid may be achieved by utilizing viscosity to substantially prevent the two fluids from mixing. In some embodiments, for example, the viscosity of the proppant-free fluid may be greater than about 50% of the viscosity of the proppant fluid. For example, the viscosity of the proppant-free fluid may be about 50% greater, or about 75% greater, or about 100% greater, or about 150% greater, or about 200% greater, or even greater, without departing from the scope of the present disclosure, such that the proppant-free fluid and the proppant fluid are substantially immiscible, encompassing any value and subset therebetween. Each of these values is critical to performing the methods of the present disclosure and may depend on a number of factors including, but not limited to, the type of base fluids selected, the natural miscibility of the two fluids, and the like. In yet other embodiments, the reverse may be true, such that the viscosity of the proppant fluid may be greater than about 50% of the viscosity of the proppant-free fluid. For example, the viscosity of the proppant fluid may be about 50% greater, or about 75% greater, or about 100% greater, or about 150% greater, or about 200% greater, or even greater, without departing from the scope of the present disclosure, such that the proppant-free fluid and the proppant fluid are substantially immiscible, encompassing any value and subset therebetween.

For example, in some embodiments, either the proppant-free fluid or the proppant fluid is a linear fluid and the other is a macromolecularly structured fluid. As described herein, the term "linear fluid" refers to a fluid comprising one or more gelling agents that do not associate with each other to form a higher viscosity macromolecular network; whereas the term "macromolecularly structured fluid" refers to a fluid comprising one or more gelling agents that associate with each other to form a higher viscosity macromolecular network, which may or may not be in the presence of one or more crosslinkers. In other embodiments, either the proppant-free fluid or the proppant fluid is a linear hydrophobic fluid and the other is a hydrophilic macromolecularly structured fluid. In yet other embodiments, either the proppant-free fluid or the proppant fluid is a linear hydrophilic fluid and the other is a hydrophobic macromolecularly structured fluid. In yet other embodiments, either the proppant-free fluid or the proppant fluid is a linear fluid and the other is a foamed fluid, as described below. Which fluid is which type in the examples above is non-limiting, provided that the proppant-free fluid is capable of suspending the proppant particulates therein.

The proppant-free fluid may be continuously pumped into the subterranean formation through the annulus between the pipe conveyance and the subterranean formation at a first pumping rate to extend the fracture already opened from the fracturing fluid. Simultaneously with the pumping of the proppant-free fluid through the annulus, the proppant fluid may be continuously pumped through the interior of the pipe conveyance at a second pumping rate that is less than the first rate applied to the proppant-free fluid. Accordingly, the proppant-free fluid and the proppant fluid are simultaneously present in a portion of the subterranean formation but remain substantially immiscible, and the pumping equipment introducing both the proppant-free and proppant fluid are continuously run rather than requiring intermittent stopping and starting. The proppant particulates, which may be aggregated together, as described below, in the proppant fluid are placed into at least a portion of the fracture in the subterranean formation, with the proppant-free fluid interspersed (but not necessarily mixed, as the two fluids are substantially immiscible), thereby forming a proppant pack with proppant-free channels formed therein. In some embodiments, the proppant-free fluid may further comprise a breaker, which may be activated followed by the removal of at least a portion of the proppant-free fluid from the subterranean formation. As used herein, the term "removal of at least a portion" of a fluid, and grammatical variants thereof, refers to the removal of at least about 75% (or at least about 80%, 85%, 90%, 95%, or 100%) of the fluid from the subterranean formation. Removal of the proppant-free fluid may be performed before or after removal of the hydraulic pressure, which results in fracture closure upon the formed proppant pack with proppant-free channels where the proppant-free fluid is no longer present.

The simultaneous and continuous pumping of both the proppant-free fluid and the proppant fluid may be continued until placement of the proppant pack having the proppant-free channels into the fracture(s). That is, the simultaneous and continuous pumping of both the proppant-free fluid and the proppant fluid may be ceased after a designed (e.g., operator designed) amount of the proppant particulates and volume of proppant-free fluid have been injected and placed into the fracture to form the proppant packs described herein. In other embodiments, the simultaneous and continuous pumping of both the proppant-free fluid and the proppant fluid may be ceased upon detection of an increase in the treating pressure above a threshold treating pressure. As described herein, the term "treating pressure" refers to a surface-pump pressure limit below which a subterranean formation operation (e.g., the methods described herein) should be performed. The term "threshold treating pressure" refers to the maximum treating pressure to (1) avoid fracturing a subterranean formation and/or (2) to avoid damaging operational equipment (e.g., completion components, pumping equipment, and the like). The threshold treating pressure may be calculated to ensure that the pump-pressure limit equates to downhole and reservoir conditions and that are within the design limits (e.g., set by the customer or an operator) of the subterranean formation operation. The threshold treating pressure may be achieved in some embodiments by adjusting rates of introduction of fluids into a formation.

The substantial immiscibility of the proppant-free fluid and the proppant fluid during continuous, simultaneous pumping at a downhole location permits the proppant particulates to aggregate within the proppant fluid, while surrounded by the proppant-free fluid, and vice versa. Accordingly, the aggregated proppant particulates form clusters or larger masses of aggregated proppant particulates which further facilitates the formation of the proppant-free channels in the proppant packs of the present disclosure. As used herein, the term "proppant particulates" encompasses these clusters or larger masses of aggregated proppant particulates.

In some embodiments, the aggregation of the proppant particulates may be further encouraged, in addition to the substantially immiscibility of the proppant-free fluid and the proppant fluid, by the use of a stabilization agent. The stabilization agent may be present as a free-flowing liquid in the proppant fluid, which may then naturally coat at least a portion of the proppant particulates within the fluid either while the fluid is static or, in other embodiments, when the fluid is in motion, such as during the pumping of the proppant fluid into the subterranean formation. Moreover, the binding fluid may be introduced into the proppant fluid for coating at least a portion of the proppant particulates for forming the aggregates described herein on-the-fly. As used herein, the term "on-the-fly" refers to performing an operation during a subterranean treatment that does not require stopping normal operations. In other embodiments, the stabilization agent may be pre-coated onto at least a portion of the proppant particulates included in the proppant fluid of the present disclosure. As used herein, the term "coat at least a portion," "coat onto at least a portion," and grammatical variants thereof referring to coating proppant particulates means that at least about 50% (or at least about 60%, 70%, 80%, 90%, or 100%) of the outer surface of the proppant particulates are coated.

The varied pumping rate between the proppant-free fluid and the proppant fluid is particularly beneficial to the methods of the present disclosure. The proppant-free fluid is pumped at a first rate, which is greater than the second rate of the proppant fluid. This rate variability results in the ability to adjust and control the ratio between the proppant-free fluid and the proppant fluid, thusly allowing customization of the size aggregated proppant particulates in the proppant fluids. That is, in some embodiments, because the proppant-free fluid and the proppant fluid are substantially immiscible, the proppant-free fluid may surround or encase portions of the proppant fluid, thereby trapping a portion of the proppant fluid and forcing aggregation of the proppant particulates therein. By so doing, the methods described herein additionally prevent discrete encased aggregated proppant particulates (surrounded or encased by the proppant-free fluid) from merging or forming larger aggregates with other proppant particulates that are not so encased or are forming separate discrete encased aggregated proppant particulates. Accordingly, the proppant-free fluid prevents these discrete encased aggregated proppant particulates from substantially settling, thereby promoting random distribution of the aggregated proppant particulates within a fracture, regardless of its geometry (i.e., vertical, horizontal, and deviated).

The plurality discrete encased aggregated proppant particulates formed in accordance with the methods of the present disclosure are surrounded by proppant-free channels formed with the proppant-free fluid. Moreover, the random distribution of the aggregated proppant particulates provides support to hold open fractures after hydraulic pressure has been removed, thus mitigating against complete closure and in some instances partial closure of the fracture, which often occurs without adequate proppant support. Accordingly, the methods of the present disclosure permit reduction in proppant particulate amount required for propping a fracture, while enhancing conductivity by the formation of the proppant-free channels.

In some embodiments, the first rate of the proppant-free fluid may be such that it is capable of maintaining open the fracture created and/or opened by the fracturing fluid. In some embodiments, the first pumping rate of the proppant-free fluid may be above the fracture gradient of the subterranean formation, and which may be, but need not be, maintained above the fracture gradient until the placement of the proppant pack having the proppant-free channels is formed within the fracture. Thus, in some embodiments, the second pumping rate of the proppant fluid may be less than the first rate and may be less than the fracture gradient pressure of the subterranean formation. The determination of whether to maintain the first pumping rate of the proppant-free fluid above the fracture gradient until placement of the proppant pack may depend on a number of factors including, for example, ensuring that the created and/or opened fracture(s) are maximally opened for placement of the proppant particulates.

In some embodiments, the first pumping rate of the proppant-free fluid may be in the range of a lower limit of about 3179 liters per minute (L/min), 3975 L/min, 4770 L/min, 5565 L/min, 6360 L/min, 7154 L/min, and 7949 L/min to an upper limit of about 12720 L/min, 11924 L/min, 11129 L/min, 10334 L/min, 9539 L/min, 8744 L/min, and 7949 L/min (equivalent to about 20 barrels per minute (bbl/min) to about 80 bbl/min), encompassing any value and subset therebetween. The pumping rate (also referred to as injection rate) may depend on a number of factors including, but not limited to, whether to exceed the fracture gradient, the depth of the interval of interest in the formation, the Young's modulus of the formation, fluid loss effects, friction pressure of the pipe conveyance, the size of the pipe conveyance, and the like. Each of these values is critical to the performance of the methods described herein, where the first pumping rate may be dependent on the type of proppant-free fluid selected, the type of proppant fluid selected, the type of gelling agents selected for each fluid, the type of proppant particulates selected, the size of proppant particulates selected, the amount of proppant particulates selected, the type of subterranean formation, the geometry of the wellbore in the subterranean formation, the type and geometry of the pipe conveyance, and the like.

The second pump rate of the proppant fluid is less than the first pump rate and, in some embodiments, may be in the range of a lower limit of about 15%, 20%, 25%, 30%, 35%, 40%, and 45% to an upper limit of about 75%, 70%, 65%, 60%, 55%, 50%, and 45% of the rate in psi of the first pump rate, encompassing any value and subset therebetween. Each of these values is critical to the performance of the methods described herein at least based on the value of the first pump rate, each of the parameters described above affecting the first pump rate, and the like.

In some embodiments, the first rate of the proppant-free fluid and the second rate of the proppant fluid may be held constant throughout the duration of their simultaneous and continuous pumping into a subterranean formation. In other embodiments, the first and second pump rate may fluctuate, provided that the first pump rate remains higher than the second pump rate according to the present disclosure, without departing from the scope of the described disclosure. Accordingly, the first and second pump rate may both increase during the performance of the methods described herein, such that they either increase proportionally, or disproportionally. Likewise, the first and second pump rate may both decrease during the performance of the methods described herein, such that they either increase proportionally, or disproportionally. Moreover, the first pump rate may increase while the second pump rate decreases, or the first pump rate may decrease while the second pump rate increases, during the performance of the methods described herein, without departing from the scope of the present disclosure.

The alteration of the first and second pump rate during the performance of the methods described herein may be desirable to control fracture generation or propagation, to control the amount of proppant-free fluid to proppant fluid in the subterranean formation at a particular location (e.g., in a fracture(s)), to aid in formation of the proppant-free channels, and the like.

The amount of proppant-free fluid to proppant fluid that is simultaneously present in the portion of the subterranean formation (e.g., at or in the fracture(s)) during performance of the methods described herein may be such that the ratio of proppant-free fluid to proppant fluid is in the range of a lower limit of about 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.5:1, 2.6:1, 2.7:1, 2.8:1, 2.9:1, 3:1, 3.1:1, 3.2:1, 3.3:1, 3.4:1, 3.5:1, 3.6:1, 3.7:1, and 3.8:1 to an upper limit of about 6:1, 5.9:1, 5.8:1, 5.7:1, 5.6:1, 5.5:1, 5.4:1, 5.3:1, 5.2:1, 5.1:1, 5:1, 4.9:1, 4.8:1, 4.7:1, 4.6:1, 4.5:1, 4.4:1, 4.3:1, 4.2:1, 4.1:1, 4:1, 3.9:1, and 3.8:1, encompassing any value and subset therebetween. Each of these values is critical to the present disclosure, where the ratio of the two fluids may be dependent on the type of fluids utilized, the type and size of proppant particulates used, the type of subterranean formation, the size of the desired fractures, and the like.

The fracturing fluids, proppant-free fluids, and proppant fluids of the present disclosure (collectively referred to as "fluids") may be any fluid suitable for use in a subterranean operation including, but not limited to, aqueous base fluids, oil base fluids, aqueous-miscible base fluids, water-in-oil emulsion base fluids, oil-in-water emulsion base fluids, and any combination thereof. Suitable aqueous base fluids may include, but are not limited to, fresh water, saltwater (e.g., water containing one or more salts dissolved therein), brine (e.g., saturated salt water), seawater, and any combination thereof.

Suitable oil base fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous-miscible base fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

The gelling agents for use in the fluids of the present disclosure may increase the viscosity thereof (e.g., so as to form alternating fluid viscosities to form substantially immiscible fluids, to suspend the proppant particulates, and the like), and may be any substance capable of gelling the fluids that may be used in a subterranean formation operation. Suitable gelling agents may include, but are not limited to, natural polymers, synthetic polymers, and any combination thereof. Oligomers, including those listed herein, capable of associating to form higher viscosity networks may also be used as the gelling agents herein, without departing from the scope of the present disclosure.

Suitable gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and any combination thereof.

Suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and any combination thereof. In certain embodiments, the gelling agent may comprise an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the fluids described herein in an amount in the range of from a lower limit of about 0.025%, 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the liquid component of the fluid, encompassing any value and subset therebetween. Each of these values is critical to the performance of the methods described herein, where amount of gelling agent may be dependent on the type of proppant-free fluid selected, the type of proppant fluid selected, the type of fracturing fluid selected, the type of gelling agents selected for each fluid, the type of proppant particulates selected, the size of proppant particulates selected, the amount of proppant particulates selected, the type of subterranean formation, the geometry of the wellbore in the subterranean formation, the type and geometry of the pipe conveyance, and the like.

In some embodiments, the fracturing fluid may comprise a gelling agent in an amount in the range of a lower limit of about 0.025%, 0.1%, 0.25%, 0.5%, 1%, 1.25%, 1.5%, 1.75%, 2%, 2.25%, and 2%, to an upper limit of about 5%, 4.75%, 4.5%, 4.25%, 4%, 3.75%, 3.5%, 3.25%, 3%, 2.75%, and 2.5% by weight of the liquid component of the fracturing fluid, encompassing any value and subset therebetween. In some embodiments, the proppant-free fluid may comprise a gelling agent in an amount in the range of a lower limit of about 0.025%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.1%, 1.15%, 1.2%, and 1.25% to an upper limit of about 2.5%, 2.45%, 2.4%, 2.35%, 2.3%, 2.25%, 2.2%, 2.15%, 2.1%, 2%, 1.95%, 1.9%, 1.85%, 1.8%, 1.75%, 1.7%, 1.65%, 1.6%, 1.55%, 1.5%, 1.45%, 1.4%, 1.35%, 1.3%, and 1.25% by weight of the liquid component of the proppant-free fluid, encompassing any value and subset therebetween. In some embodiments, the proppant fluid may comprise a gelling agent in an amount in the range of a lower limit of about 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the liquid component of the proppant fluid, encompassing any value and subset therebetween.

In some embodiments, it may be desirable to crosslink the gelling agent and the fluids may further comprise one or more crosslinking agents. The crosslinking agents may comprise a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and any combination thereof.

In certain embodiments, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The coating may be one or more of the encapsulating materials discussed previously with reference to encapsulating the proppant particulates described herein. The choice of a particular crosslinking agent may be governed by several considerations that recognized by one skilled in the art, including, but not limited, the type of gelling agent included, the molecular weight of the gelling agent(s), the conditions in the subterranean formation being treated, the safety handling requirements, the pH of the fluid, temperature, and/or the desired delay for the crosslinking agent to crosslink the gelling agent molecules.

When included, suitable crosslinking agents may be present in the fluids in an amount sufficient to provide the desired degree of crosslinking between molecules of the gelling agent. In certain embodiments, the crosslinking agent may be present in the fluids in an amount in the range of from a lower limit of about 0.005%, 0.05%, 0.1%, 0.15%, 0.2%, 0.25%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by weight of the liquid component of the fluid, encompassing any value and subset therebetween.

In some embodiments, the fluids for use in conjunction with the embodiments of the present disclosure may additionally be foamed, particularly the proppant-free fluid requiring suspension of proppant particulates therein. For example, foaming the proppant-free fluid may greatly enhance the immiscibility between the proppant fluid and the proppant-free fluid, while enhancing formation of the discrete encased aggregated proppant particulates from the proppant fluid, as discussed above. As used herein, the term "foam" refers to a two-phase composition having a continuous liquid phase and a discontinuous gas phase. In some embodiments, fluids may be foamed by inclusion of a gas and/or a foaming agent.

Suitable gases for use in the fluids described herein may include, but are not limited to, nitrogen, carbon dioxide, air, methane, helium, argon, and any combination thereof. One skilled in the art, with the benefit of this disclosure, should understand the benefit of each gas. By way of non-limiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant particulates transport capability to the proppant fluid.

Suitable foaming agents may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed fluids at concentrations ranging typically from a lower limit of about 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, and 1% to an upper limit of about 2%, 1.95%, 1.9%, 1.85%, 1.8%, 1.75%, 1.7%, 1.65%, 1.6%, 1.55%, 1.5%, 1.45%, 1.4%, 1.35%, 1.3%, 1.25%, 1.2%, 1.15%, 1.1%, and 1% by weight of the liquid component of the fluid (i.e., from about 0.5 to about 20 gallons per 1000 gallons of the liquid component of the fluid), encompassing any value and subset therebetween.

In some embodiments, the quality of the foamed fluid may range from a lower limit of about 5%, 10%, 25%, 40%, 50%, 60%, or 70% gas volume to an upper limit of about 95%, 90%, 80%, 75%, 60%, or 50% gas volume, encompassing any value and subset therebetween. In some embodiments, the foamed fluid may have a foam quality from about 85% to about 95%, or about 90% to about 95%.

In some embodiments, the proppant-free fluid and/or the proppant fluid may further comprise a breaker. As used herein, the term "breaker" refers to any substance that is capable of decreasing the viscosity of a fluid. For example, in some embodiments, the breaker may be included in the proppant-free fluid and after placement of the proppant particulates from the proppant fluid described herein into a fracture in a subterranean formation to form a proppant pack having proppant-free channels therein, the breaker may be activated to reduce the viscosity of the proppant-free fluid. The broken, less viscous proppant-free fluid may then be produced to the surface for removal of at least a portion of the broken proppant-free fluid from the subterranean formation. That is, at least some of the proppant-free fluid may remain in the subterranean formation because 100% removal may not be achievable in practice.

In some embodiments, the breaker may be delayed by encapsulation with a coating (e.g., a porous coating through which the breaker may diffuse slowly, or a degradable coating that degrades downhole) that delays the release of the breaker. In other embodiments, the breaker may be a degradable material (e.g., poly(lactic) acid or poly(glycolic acid)) that releases an acid or alcohol in the presence of an aqueous liquid. Suitable breakers for use in the fluids described herein may include, but are not limited to, an oxidative breaker, an acid breaker, a delayed release acid breaker, a delayed release enzyme breaker, a temperature activated breaker, a hydrolysable ester breaker, any encapsulated in an encapsulating material, and any combination thereof. The encapsulating material may be any material capable of delaying the activity of the breaker including, but not limited to, those discussed herein with reference to crosslinking agents.

Examples of oxidative breakers may include, but are not limited to, organic peroxides, alkali metal persulfates, alkali metal chlorites, bromates, chlorates, hypochlorites, permanganates, and any combination thereof. Examples of acid breakers may include, but are not limited to, hydrochloric acid, hydrofluoric acid, hydrobromic acid, hydroiodic acid, sulfuric acid, nitric acid, boric acid, chromic acid, and any combination thereof. Examples of delayed release acid breakers may include, but are not limited to, acetic anhydride and organic and inorganic acids such as fumaric acid, benzoic acid, sulfonic acid, phosphoric acids, aliphatic polyesters, poly lactic acid, poly(lactides), polyanhydrides, poly(amino acids), and any combination thereof.

Examples of suitable delayed release enzyme breakers may include, but are not limited to, alpha and beta amylases, exo- and endo-glucosidases, amyloglucosidase, oligoglucosidase, invertase, maltase, cellulase, hemicellulase, endo-glucosidase, endo-xylanase, exo-xylanase, and any combination thereof. In some embodiments, the enzyme breakers are enzymes or combinations of enzymes that attack the glucosidic linkages of a cellulose gelling agent backbone and degrade the gelling agent into mostly monosaccharide and disaccharide units. Temperature activated breakers may activate by being heated by the subterranean zone in which they are placed, or by another external heat source. Examples of suitable temperature activated breakers may include, but are not limited to, alkaline earth metal peroxides, such as calcium peroxide and magnesium peroxide, zinc peroxide, and any combination thereof. Examples of suitable hydrolysable esters may include, but are not limited to, sorbitol, catechol, dimethyl glutarate and mixtures of dimethyl glutarate, dimethyl succinate, dimethyl adipate, and any combination thereof.

In certain embodiments, the breaker may be present in the fluids in an amount in the range of from a lower limit of about 0.0001%, 0.001%, 0.01%, 0.05%, 0.1%, 0.15%, 0.2%, 0.25%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by weight of the gelling agent, encompassing any value and subset therebetween.

In other embodiments, the fluids of the present disclosure may further comprise an additive, provided that the additive does not interfere with the methods of forming the proppant-free channels in the proppant packs described herein (e.g., does not interfere with the substantial immiscibility of the proppant-free fluid and the proppant fluids). Suitable additives may include, but are not limited to, a salt, a weighting agent, an inert solid, a fluid loss control agent, an emulsifier, a dispersion aid, a corrosion inhibitor, an emulsion thinner, an emulsion thickener, a surfactant, a lost circulation material, a pH control additive, a biocide, a stabilizer, a chelating agent, a scale inhibitor, a gas hydrate inhibitor, an oxidizer, a reducer, a friction reducer, a clay stabilizing agent, and any combination thereof.

The proppant particulates for use in the proppant fluid of the present disclosure may be formed of any material capable of withstanding fracture closure pressures in a subterranean formation. In some embodiments, the proppant particulates may be a natural or man-made material such as, for example, silica, alumina, fumed carbon, carbon black, graphite, mica, titanium dioxide, meta-silicate, calcium silicate, kaolin, talc, zirconia, boron, fly ash, crushed walnut, and any combination thereof. The proppant particulates may additionally be of any size and shape combination suitable for the particular subterranean formation operation in which they are being used (e.g., a fracturing operation).

The shape of the micro-proppant may be such that it is substantially spherical or substantially non-spherical, which may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, and any combination thereof. That is, in embodiments wherein the proppant particulates are substantially non-spherical, the aspect ratio of the material may range such that the material is fibrous to such that it is cubic, octagonal, or any other configuration.

In some embodiments, the proppant particulates may be present in the proppant fluid of the present disclosure in an amount in the range of from a lower limit of about 0.1 pound per gallon (lbm/gal), 1 lbm/gal, 2 lbm/gal, 3 lbm/gal, 4 lbm/gal, 5 lbm/gal, 6 lbm/gal, 7 lbm/gal, 8 lbm/gal, 9 lbm/gal, and 10 lbm/gal to an upper limit of about 20 lbm/gal, 19 lbm/gal, 18 lbm/gal, 17 lbm/gal, 16 lbm/gal, 15 lbm/gal, 14 lbm/gal, 13 lbm/gal, 12 lbm/gal, 11 lbm/gal, and 10 lbm/gal of the proppant fluid, encompassing any value and subset therebetween. Each of these values is critical to the methods of the present disclosure and may depend on a number of factors including, but not limited to, the type and geometry of the subterranean formation, the type of proppant particulates selected (e.g., their crush strength), the type of fractures being propped, and the like, and any combination thereof. In some embodiments, the proppant particulates may be present in the proppant fluid in an amount in the range of about 1 lbm/gal to about 8 lbm/gal, encompassing any value and subset therebetween.

In some embodiments, the proppant particulates may be micro-sized, nano-sized, or any combination thereof. The micro-sized proppant particulates may be sized such that they have an average diameter in the range of from a lower limit of about 1 micron (μm), 10 μm, 20 μm, 30 μm, 40 μm, 50 μm, 60 μm, and 70 μm to an upper limit of about 140 μm, 130 μm, 120 μm, 110 μm, 100 μm, 90 μm, 80 μm, and 70 μm, encompassing any value and subset therebetween. The nano-sized proppant particulates may be sized such that they have an average diameter in the range of from a lower limit of about 5 nanometers (nm), 50 nm, 100 nm, 150 nm, 200 nm, 250 nm, 300 nm, 350 nm, 400 nm, 450 nm, and 500 nm to an upper limit of about 1000 nm, 950 nm, 900 nm, 850 nm, 800 nm, 750 nm, 700 nm, 650 nm, 600 nm, 550 nm, and 500 nm, encompassing any value and subset therebetween. Each of these micro-sized and nano-sized proppant particulate values is critical to the embodiments of the present disclosure and may be dependent upon a number of factors including, but not limited to, the type of subterranean formation being treated, the size and geometry of the fractures being propped, the type and composition of the proppant particulates, and the like, and any combination thereof.

The proppant particulates in the proppant fluid may be a mixture of micro-sized and nano-sized proppant particulates. For example, in some embodiments, the micro-sized proppant particulates may be present in a ratio to the nano-sized proppant particulates in the proppant fluid in the range of from a lower limit of about 1:1, 1.5:1, 2:1, 2.5:1, 3:1, 3.5:1, 4:1, 4.5:1, and 5:1 to an upper limit of about 10:1, 9.5:1, 9:1, 8.5:1, 8:1, 7.5:1, 7:1, 6.5:1, 6:1, 5.5:1, and 5:1, encompassing any value and subset therebetween.

In other embodiments, the micro-sized proppant particulates and nano-sized proppant particulates may be metered into the fracturing fluid such that the micro-sized and nano-sized proppant particulates are first placed into the far-field region of fractures within the subterranean formation, such as in microfractures of complex fracture networks. Thereafter, larger proppant particulates, such as the standard proppant particulates described above, may be metered into the proppant fluid or otherwise included in the proppant fluid prior to the introduction of the proppant fluid, where they are placed in the near-wellbore region of fractures within the subterranean formation.

In yet other embodiments, the micro-sized proppant particulates and nano-sized proppant particulates may be metered into the proppant fluid such that the micro-sized and nano-sized proppant particulates are first included in the proppant fluid and placed into the far-field region of fractures within the subterranean formation, such as in microfractures of complex fracture networks. Thereafter, larger proppant particulates, such as the standard proppant particulates described above, may be metered into the proppant fluid where they are placed in the near-wellbore region of fractures within the subterranean formation. Accordingly, the formed clusters or aggregates of proppant particulates during the methods of the present disclosure, formed by the substantial immiscibility of the proppant-free fluid and the proppant fluid, may be formed by solely nano-sized proppant particulates, solely micro-sized proppant particulates, solely standard proppant particulates, or a mixture of two or more of the sizes, without departing from the scope of the present disclosure. As used herein, the term "microfractures" refers to a discontinuity in a portion of a subterranean formation that extends from a main fracture or that creates an etch in the formation, including a main fracture. Such microfractures may be channels, perforations, holes, cracks, or other ablations within the formation. As used herein, the term "fracture network" refers to interconnected fractures and microfractures that may allow produced fluids to flow therethrough Enhancing the complexity of such fracture networks may in turn enhance the conductivity and productivity of the formation having the fracture network.

In some embodiments, to enhance the fracture network within a subterranean formation, such nano-sized and micro-sized proppant particulates may additionally be included in the fracturing fluids of the present disclosure in the same amounts and/or by the same methods (e.g., metering as described above) described with reference to the propping fluids above. Like the nano- and micro-sized proppant particulates that may be used in the propping fluids, the nano- and micro-sized proppant particulates for placement in the far-field regions of fractures, such as in microfractures of complex fracture networks.

In some embodiments, a portion of the proppant particulates in the proppant fluid may be formed from degradable particles. One purpose of including degradable particulates may be to ensure or increase the permeability of the propped fracture. Thus, as the degradable particulates are removed with time, the porosity of the propped fracture increases. The degradable particulates are preferably substantially uniformly distributed throughout the formed proppant pack. It may also be desirable that the degradable particulates have a similar size, shape, and specific gravity as those of the proppant particulates to enhance the distribution of degradable particulates among the proppant particulate and to minimize the segregation between the two materials. Over time, the degradable material will degrade, in situ, causing the degradable material to substantially be removed from the proppant pack and to leave behind voids in the proppant pack. These voids enhance the porosity of the proppant pack, which may result, in situ, in enhanced conductivity.

In some embodiments, the degradable proppant particulates may be formed from a degradable polymer. As used herein, a polymer is considered to be "degradable" if the degradation is due to, in situ, a chemical and/or radical process such as hydrolysis, oxidation, or UV radiation. The degradability of a polymer depends, at least in part, on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, such as temperature, presence of moisture, oxygen, microorganisms, enzymes, pH, and the like.

In some embodiments, the degradable particulates used are oil-degradable polymers. Where such oil-degradable proppant particulates are used, in the event the closure of the fracture undesirably compacts the proppant (thus undesirably reducing the permeability of the proppant pack), the oil-degradable proppant may be degraded by the produced fluids, thus restoring at least some of the lost permeability. The degradable proppant may also be degraded by materials purposely placed in the formation by injection, mixing the degradable particle with delayed reaction degradation agents, or other suitable means to induce degradation.

Oil-degradable particulates that may be used in accordance with the embodiments of the present disclosure may be either natural or synthetic polymers. Some particular examples include, but are not limited to, polyacrylics, polyamides, polyolefins (e.g., polyethylene, polypropylene, polyisobutylene, polystyrene, and the like), and any combination thereof. Other suitable oil-degradable polymers include those that have a melting point which is such that the polymer will dissolve or otherwise lose integrity at the temperature of the subterranean formation in which it is placed, such as a wax material.

In addition to oil-degradable polymers, other degradable polymers may be suitable for use as the degradable proppant particulates described herein. Suitable examples of degradable polymers may include, but are not limited to, polysaccharides (e.g., dextran, cellulose, and the like), chitins, chitosans, proteins, aliphatic polyesters, poly(lactides), poly(glycolides), poly(s-caprolactones), poly(hydroxybutyrates), poly(anhydrides), aliphatic polycarbonates, aromatic polycarbonates, poly(orthoesters), poly(amino acids), poly(ethylene oxides), polyphosphazenes, and any combination thereof.

Poly(anhydrides) may be a particularly suitable degradable polymer useful in the embodiments of the present disclosure. Poly(anhydride) hydrolysis proceeds, in situ, via free carboxylic acid chain-ends to yield carboxylic acids as final degradation products. The erosion time can be varied over a broad range of changes in the polymer backbone. Examples of suitable poly(anhydrides) may include, but are not limited to, poly(adipic anhydride), poly(suberic anhydride), poly(sebacic anhydride), poly(dodecanedioic anhydride), poly(maleic anhydride), poly(benzoic anhydride), and any combination thereof.

Dehydrated salts may also be used alone or in combination with the degradable polymers previously described in accordance with the embodiments of the present disclosure as degradable proppant particulates. A dehydrated salt is suitable if it will degrade over time as it hydrates. For example, a particulate solid anhydrous borate material that degrades over time may be suitable. Specific examples of particulate solid anhydrous borate materials may include, but are not limited to, anhydrous sodium tetraborate (also known as anhydrous borax), anhydrous boric acid, and any combination thereof. These anhydrous borate materials are only slightly soluble in water. However, with time and heat in a subterranean environment, the anhydrous borate materials react with surrounding aqueous fluid and become hydrated. The resulting hydrated borate materials are highly soluble in water as compared to anhydrous borate materials and as a result degrade in the presence of an aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts, like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example may include a blend of poly(lactic acid) and boric oxide. Other materials that undergo an irreversible degradation may also be suitable, if the products of the degradation do not undesirably interfere with either the conductivity of the proppant pack or with the production of any of the fluids from the subterranean formation.

In choosing the appropriate degradable proppant particulates, one should consider the degradation products that will result. These degradation products should not adversely affect other operations or components and may even be selected to improve the long term performance/conductivity of the propped fracture. The choice of degradable material also can depend, at least in part, on the conditions of the well (e.g., wellbore temperature). For example, poly(lactic acid) homopolymers and copolymers have been found to be suitable for lower temperature wells, including those within the range of about 60° F. to about 160° F. (about 15° C. to about 71° C.). As a specific example, poly(lactic-co-glycolic acid) copolymers have been found to be suitable for lower temperature wells, including those within the range of about 100° F. to about 160° F. (about 37° C. to about 71° C.), and poly(lactic acid) has been found to be suitable for wellbore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments a preferable result is achieved if the degradable proppant particulates degrade slowly over time as opposed to instantaneously. Even more preferable results have been obtained when the degradable proppant particulates do not begin to degrade until after the proppant pack has developed some compressive strength. The slow degradation of the degradable proppant particulates, in situ, may help to maintain the stability of the proppant pack.

In some embodiments, the degradable proppant particulates may be present in the range of from a lower limit of about 10%, 15%, 20%, 25%, 30%, 35%, 40%, and 45% to an upper limit of about 90%, 85%, 80%, 75%, 70%, 65%, 60%, 55%, 50%, and 45% of the combined degradable and non-degradable proppant particulates, encompassing any value and subset therebetween. For example, in some embodiments, the degradable proppant particulates may be present from about 20% to about 70%, or from about 25% to about 50% of the combined degradable and non-degradable proppant particulates. The amount of degradable proppant particulates should be selected to enhance the conductivity or permeability of the formed proppant pack described herein without undermining the stability of the proppant pack.

In some embodiments, as previously discussed, at least a portion of the proppant particulates (collectively including any degradable proppant particulates that may also be used, unless specifically stated otherwise) may be coated with a stabilization agent. The stabilization agent may be used to facilitate the formation of the clusters or aggregates of proppant particulates, such that the substantial immiscibility of the proppant-free fluid and the proppant fluid works in concert with the stabilization agent to form the clusters.

Suitable stabilization agents may include, but are not limited to, a non-aqueous tackifying agent, an aqueous tackifying agent, a silyl-modified polyamide compound, a curable resin, a crosslinkable aqueous polymer composition, a polymerizable organic monomer composition, a zeta potential-modifying aggregating composition, a silicon-based resin, a binder, a stabilization agent emulsion, and any combination thereof. Such combinations may include, for example, use of a non-curable stabilization agent (e.g., one that does not cure into a solid, hardened mass) and/or a curable stabilization agent to for the cluster of proppant particulates described herein.

As previously stated, the stabilization agents may be coated on-the-fly onto the proppant particulates by including the stabilization agent in the proppant fluid along with the proppant particulates, directly prior to pumping the fluid into the formation. In other instances, the stabilization agents may be coated onto at least a portion of the proppant particulates directly before including them into the proppant fluid to be pumped into the formation (i.e., pre-coated).

Non-aqueous tackifying agents suitable for use in the embodiments disclosed herein may be used such that they cure to form a non-hardened coating, or may be combined with a multifunctional material capable of reacting with the non-aqueous tackifying compound to cure to form a hardened coating. As used herein, the term "cure" and grammatical variants thereof (e.g., "curing") refers to substantially non-flowable reaction product, such as through the process of cross-linking chemical reactions of the stabilization agent. A "hardened coating" as used herein means that the reaction of the non-aqueous tackifying agent with the multifunctional material will result in a substantially non-flowable reaction product that exhibits a higher compressive strength in a consolidated agglomerate than the non-aqueous tackifying agent alone. In this instance, the non-aqueous tackifying agent may function similarly to a curable resin.

For use in the embodiments described herein, the non-aqueous tackifying agents may comprise polyamides that are liquids or in solution at the temperature of the subterranean formation such that they are, by themselves, non-hardening when introduced into the subterranean formation. A particularly preferred product is a condensation reaction product comprised of a polyacid and a polyamine. The non-aqueous tackifying agents may further comprise amounts of dibasic acids containing some trimer and higher oligomers and also small amounts of monomer acids that are reacted with polyamines, without departing from the scope of the present disclosure. Other polyacids for use as the non-aqueous tackifying agents may include, but are not limited to, trimer acids, synthetic acids produced from fatty acids, maleic anhydride, acrylic acid, and the like, and combinations thereof. Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Multifunctional materials suitable for use in the present disclosure may include, but are not limited to, an aldehyde (e.g., formaldehyde), a dialdehyde (e.g., glutaraldehyde, hemiacetals or aldehyde releasing compounds), a diacid halide, a dihalide (e.g., dichlorides and dibromides), a polyacid anhydride (e.g., citric acid, epoxides, furfuraldehyde, glutaraldehyde or aldehyde condensates), and any combination thereof. In some embodiments, the multifunctional material may be mixed with the non-aqueous tackifying agent in an amount of from a lower limit of about 0.01%, 0.5%, 0.1%, 0.5%, 1%, 5%, 10%, and 15% to an upper limit of about 50%, 45%, 40%, 35%, 30%, 25%, 20%, and 15% by weight of the non-aqueous tackifying agent, encompassing any value and subset therebetween. In other embodiments, the multifunctional material may be mixed with the non-aqueous tackifying agent in an amount of from about 0.5% to about 1% by weight of the non-aqueous tackifying agent.

Aqueous tackifying agents suitable for use in the embodiments of the present disclosure are usually not generally significantly tacky when placed onto a proppant particulate, but are capable of being "activated" (e.g., destabilized, coalesced and/or reacted) to transform the compound into a sticky, tacky compound at a desirable time. This may permit an operator to design time-based proppant particulates that exhibit certain qualities (e.g., tackiness) only after activation. As used herein, the term "tacky," and all grammatical variants thereof, refers to a substance having a nature such that it is somewhat sticky to the touch and capable of being applied to a solid substrate (e.g., a proppant particulate). In some embodiments, a pretreatment may be first contacted with the surface of a proppant particulate to prepare it to be coated with an aqueous tackifying agent. Suitable aqueous tackifying agents may be charged polymers that comprise compounds that, when in a fluid, will form a non-hardening coating (by itself or with an activator). In some embodiments, the aqueous tackifying agent, when coated onto a proppant particulate, will increase the continuous critical re-suspension velocity of the proppant particulate when included in the proppant fluids described herein. The aqueous tackifying agent may enhance the grain-to-grain contact between the individual proppant particulates within the formation, helping bring about the formation of the clusters of proppant particulates described herein, such that the clusters are cohesive, flexible, and permeable masses of proppant particulates (e.g., a partial monolayer or a partial multilayer) upon curing.

Suitable aqueous tackifying agents may include any polymer that can bind, coagulate, or flocculate a proppant particulate. Also, polymers that function as pressure-sensitive adhesives may be suitable. Examples of aqueous tackifying agents suitable for use in the embodiments herein may include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% $C_1$-$C_{30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. The term "copolymer," as used herein, is not limited to polymers comprising two types of monomeric units, but includes any combination of monomeric units, e.g., terpolymers, tetrapolymers, and the like.

Suitable hydrophillic monomers may be any monomer that will provide polar oxygen-containing or nitrogen-containing groups. Suitable hydrophillic monomers may include, but are not limited to, dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

Resins suitable for use as a stabilization agent of the embodiments of the present disclosure may include any resin capable of forming a hardened, consolidated mass upon curing. Many such resins are commonly used in subterranean operations, and some suitable resins may include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, silicon-based resins, polyester resins and hybrids and copolymers thereof, polyurethane resins and hybrids and copolymers thereof, acrylate resins, silicon-based resins, and any combination thereof.

Some suitable resins, such as epoxy resins, may be cured with an internal catalyst or activator so that when pumped down hole, they may be cured using time and temperature. Other suitable resins, such as furan resins generally require a time-delayed catalyst or an external catalyst to help activate the polymerization of the resins if the cure temperature is low (i.e., less than about 121° C. (about 250° F.), but will cure under the effect of time and temperature, as well as a subterranean formation having a formation temperature above about 121° C. (about 250° F.), preferably above about 149° C. (about 300° F.). It is within the ability of one skilled in the art, with the benefit of this disclosure, to select a suitable resin for use in embodiments of the present disclosure and to determine whether a catalyst is required to trigger curing. By way of example, a silicon-based resin system as may be used as a more eco-friendly choice in cases where epoxy or furan-based resins pose environmental concerns.

Any solvent that is compatible with the resin and achieves the desired viscosity effect is suitable for use in the embodiments of the present disclosure, such as to prepare the resin to coat the proppant particulates. Suitable solvents may include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and any combination thereof. Other solvents may include, but are not limited to, aqueous dissolvable solvents such as, methanol, isopropanol, butanol, and glycol ether solvents, and combinations thereof. Suitable glycol ether solvents may include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof. Selection of an appropriate solvent is dependent on at least the resin composition chosen.

Suitable silyl-modified polyamide compounds that may be used as a stabilization agent in the embodiments of the present disclosure are those that are substantially self-hardening compositions capable of at least partially adhering to a surface of a proppant particulate in an unhardened state, and that are further capable of self-hardening into a substantially non-tacky state. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In other embodiments, the stabilization agent may comprise crosslinkable aqueous polymer compositions. Generally, suitable crosslinkable aqueous polymer compositions comprise an aqueous solvent, a crosslinkable polymer, and a crosslinker. The aqueous solvent may be any aqueous solvent in which the crosslinkable composition and the crosslinker may be dissolved, mixed, suspended, or dispersed to facilitate gel formation. For example, the aqueous solvent used may be freshwater, salt water, brine, seawater, or any other aqueous liquid that does not adversely react with the other components used in accordance with this disclosure or with a subterranean formation.

Examples of crosslinkable aqueous polymer compositions for use as the stabilization agents described herein may include, but are not limited to, carboxylate-containing polymers and acrylamide-containing polymers. The most suitable polymers are thought to be those that would absorb or adhere to proppant particulate surfaces. Examples of suitable acrylamide-containing polymers may include, but are not limited to, polyacrylamide, partially hydrolyzed polyacrylamide, copolymers of acrylamide and acrylate, carboxylate-containing terpolymers, tetrapolymers of acrylate, and any combination thereof. Additional examples of suitable crosslinkable aqueous polymers may include, but are not limited to, hydratable polymers comprising polysaccharides and derivatives thereof, and that contain one or more of the monosaccharide units: galactose, mannose, glucoside, glucose, xylose, arabinose, fructose, glucuronic acid, or pyranosyl sulfate. Suitable natural hydratable polymers may include, but are not limited to, guar gum, locust bean gum, tara gum, konjak, tamarind, starch, cellulose, karaya, xanthan, tragacanth, and carrageenan, any derivative thereof, and any combination thereof.

Suitable hydratable synthetic polymers and copolymers that may be used as the crosslinkable aqueous polymer compositions may include, but are not limited to, polycarboxylates (e.g., polyacrylates and polymethacrylates), polyacrylamides, methylvinyl ether polymers, polyvinyl alcohols, polyvinylpyrrolidone, any derivative thereof, and any combination thereof. The crosslinkable polymer used should be included in the crosslinkable aqueous polymer composition in an amount sufficient to form the desired gelled substance for coating onto a proppant particulate. In some embodiments, the crosslinkable polymer may be included in the crosslinkable aqueous polymer composition in an amount in the range of from a lower limit of about 1%, 2%, 3%, 4%, 5%, 6%, 7%, 8%, 9%, 10%, 11%, 12%, 13%, 14%, and 15% to an upper limit of about 30%, 29%, 28%, 27%, 26%, 25%, 24%, 23%, 22%, 21%, 20%, 19%, 18%, 17%, 16%, and 15% by weight of the aqueous solvent, encompassing any value and subset therebetween. In another embodiment, the crosslinkable polymer may be included in the crosslinkable aqueous polymer composition in an amount in the range of from about 1% to about 20% by weight of the aqueous solvent.

The crosslinkable aqueous polymer compositions of the embodiments described herein further comprise a crosslinker for crosslinking the crosslinkable polymers to form the desired gelled substance for coating onto the proppant particulates. In some embodiments, the crosslinker is a molecule or complex containing a reactive transition metal cation. In some embodiments, the crosslinker may comprise trivalent chromium cations complexed or bonded to anions, atomic oxygen, or water. Examples of suitable crosslinkers may include, but are not limited to, compounds or complexes containing chromic acetate and/or chromic chloride. Other suitable transition metal cations may include, but are not limited to, chromium VI within a redox system, aluminum III, iron II, iron III, and zirconium IV. Combinations of these crosslinkers may also be suitable.

The crosslinker may be present in the crosslinkable aqueous polymer compositions of the embodiments of the present disclosure in an amount sufficient to provide, among other things, the desired degree of crosslinking. In some embodiments, the crosslinker may be present in the crosslinkable aqueous polymer compositions in an amount in the range of from a lower limit of about 0.01%, 0.025%, 0.05%, 0.075%, 0.1%, 0.25%, 0.5%, 0.75%, 1%, 1.25%, 1.5%, 1.75%, 2%, and 2.25% to an upper limit of about 5%, 4.75%, 4.5%, 4.25%, 4%, 3.75%, 3.5%, 3.25%, 3%, 2.75%, 2.5%, and 2.25% by weight of the crosslinkable aqueous polymer composition, encompassing any value and subset therebetween. The exact type and amount of crosslinker(s) used may depend upon the specific crosslinkable polymer to be crosslinked, formation conditions, if crosslinked downhole, and the like.

Optionally, the crosslinkable aqueous polymer compositions may further comprise a crosslinking delaying agent, such as a polysaccharide crosslinking delaying agent derived from guar, guar derivatives, cellulose derivatives, or combinations thereof. The crosslinking delaying agent may be included in the crosslinkable aqueous polymer compositions, among other things, to delay crosslinking of the crosslinkable aqueous polymer compositions until desired (e.g., to control the timing of the curing of the stabilization agent coated onto at least a portion of the proppant particulates).

In other embodiments, the stabilization agent may comprise polymerizable organic monomer compositions. Generally, suitable polymerizable organic monomer compositions comprise an aqueous fluid, a water-soluble polymerizable organic monomer, an oxygen scavenger, and a primary initiator. The aqueous fluid component of the polymerizable organic monomer composition generally may be freshwater, salt water, brine, seawater, or any other aqueous liquid that does not adversely react with the other components used in accordance with this disclosure, including those provided as part of the fluids described herein.

A variety of monomers may be suitable for use as the water-soluble polymerizable organic monomers in the embodiments of the present disclosure. Examples of suitable monomers may include, but are not limited to, acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyltriethylammonium chloride, N-vinyl pyrrolidone, vinylphosphonic acid, and methacryloyloxyethyl trimethylammonium sulfate, and any combination thereof. In some embodiments, the water-soluble polymerizable organic monomer should be self-crosslinking. Examples of suitable monomers which are thought to be self-crosslinking may include, but are not limited to, hydroxyethylacrylate, hydroxyethylmethacrylate, hydroxyethylmethacrylate, N-hydroxymethylacrylamide, N-hydroxymethyl-methacrylamide, polyethylene amine, polyethylene glycol acrylate, polyethylene glycol methacrylate, polypropylene glycol acrylate, and polypropylene glycol methacrylate, and any combination thereof. Of these, hydroxyethylacrylate may be preferred in some instances. An example of a particularly suitable monomer is hydroxyethylcellulose-vinyl phosphoric acid.

The water-soluble polymerizable organic monomer (or monomers where a combination thereof is used) should be included in the polymerizable organic monomer composition in an amount sufficient to form the desired gelled substance after placement on the proppant particulates described herein. In some embodiments, the water-soluble polymerizable organic monomer may be included in the polymerizable organic monomer composition in an amount in the range of from a lower limit of about 1%, 2%, 4%, 6%, 8%, 10%, 12%, 14%, and 16% to an upper limit of about 30%, 28%, 26%, 24%, 22%, 20%, 18%, and 16% by weight of the aqueous fluid, encompassing any value and any subset therebetween. In another embodiment, the water-soluble polymerizable organic monomer may be included in the polymerizable organic monomer composition in an amount in the range of from about 1% to about 20% by weight of the aqueous fluid.

The presence of oxygen in the polymerizable organic monomer composition may inhibit the polymerization process of the water-soluble polymerizable organic monomer or monomers, which may allow control over (e.g., delay) the curing of the polymerizable organic monomer composition to form clusters of the proppant particulates described herein. In some embodiments, an oxygen scavenger, such as stannous chloride, may be included in the polymerizable monomer composition. In order to improve the solubility of stannous chloride so that it may be readily combined with the polymerizable organic monomer composition, the stannous chloride may be pre-dissolved in a hydrochloric acid solution. For example, the stannous chloride may be dissolved in about a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from a lower limit of about 0.005%, 0.01%, 0.1%, 0.5%, 1%, 1.5%, 2%, 2.5%, 3%, 3.5%, 4%, and 4.5% to an upper limit about 10%, 9.5%, 9%, 8.5%, 8%, 7.5%, 7%, 6.5%, 6%, 5.5%, 5%, and 4.5% by weight of the polymerizable organic monomer composition, encompassing any value and any subset therebetween. Generally, the stannous chloride may be included in the polymerizable organic monomer composition of the embodiments of the present disclosure in an amount in the range of from about 0.005% to about 0.1% by weight of the polymerizable organic monomer composition.

A primary initiator may be used, among other things, to initiate curing (i.e., polymerization) of the water-soluble polymerizable organic monomer(s). Any compound or compounds that form free radicals in aqueous solution may be used as the primary initiator. The free radicals may act, among other things, to initiate polymerization of the water-soluble polymerizable organic monomer present in the polymerizable organic monomer composition. Compounds suitable for use as the primary initiator may include, but are not limited to, alkali metal persulfates, peroxides, oxidation-reduction systems employing reducing agents (e.g., sulfites in combination with oxidizers), azo polymerization initiators, and any combination thereof. Suitable azo polymerization initiators may include, but are not limited to, 2,2'-azobis (2-imidazole-2-hydroxyethyl) propane, 2,2'-azobis(2-aminopropane), 4,4'-azobis(4-cyanovaleric acid), 2,2'-azobis(2-methyl-N-(2-hydroxyethyl) propionamide, and any combination thereof. Generally, the primary initiator should be present in the polymerizable organic monomer composition in an amount sufficient to initiate polymerization of the water-soluble polymerizable organic monomer(s). In certain embodiments, the primary initiator may be present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween. Of note, as the polymerization temperature increases, the required level of activator decreases.

Optionally, the polymerizable organic monomer compositions further may comprise a secondary initiator. A secondary initiator may be used, for example, where the polymerizable organic monomer composition is placed into a subterranean formation that is relatively cool as compared to the surface, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments, the secondary initiator is present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween.

Also optionally, the polymerizable organic monomer compositions of the embodiments of the present disclosure may further comprise a crosslinker for crosslinking the polymerizable organic monomer compositions (e.g., into a gelled substance). In some embodiments, the crosslinker may be any crosslinker capable of crosslinking the polymerizable organic monomer composition that does not adversely interfere with the proppant particulates, or the fluids described herein. Examples of suitable crosslinkers include those discussed previously with reference to crosslinkable aqueous polymer compositions. Generally, the crosslinker may be present in polymerizable organic monomer compositions in an amount in the range of from a lower limit of about 0.01%, 0.02%, 0.04%, 0.06%, 0.08%, 0.1%, 0.2%, 0.4%, 0.6%, 0.8%, 1%, 1.2%, 1.4%, 1.6%, 1.8%, and 2% to an upper limit of about 5%, 4.8%, 4.6%, 4.4%, 4.2%, 4%, 3.8%, 3.6%, 3.4%, 3.2%, 3%, 2.8%, 2.6%, 2.4%, 2.2%, and 2% by weight of the polymerizable organic monomer composition, encompassing any value and any subset therebetween.

In some embodiments, the stabilization agent may comprise a binder. Suitable binders may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the embodiments of the present disclosure may generally comprise:
(I) a consolidant comprising a hydrolyzate or precondensate of:
(a) at least one organosilane of the general Formula IV:

RnSiX4-n      Formula IV in which the R radicals are the same or different and are each hydrolytically non-removable groups, the X radicals are the same or different and are each hydrolytically removable groups or hydroxyl groups and n is 1, 2 or 3,
(b) optionally at least one hydrolyzable silane of the general Formula V:

SiX4      Formula V in which the X radicals are each as defined above, and
(c) at least one metal compound of the general Formula VI:

MXa      Formula VI in which M is a metal of main groups I to VIII or of transition groups II to VIII of the Periodic Table of the Elements including boron, X is as defined in Formula IV, where two X groups may be replaced by one oxo group, and a corresponds to the valence of the element,
where the molar ratio of silicon compounds used to metal compounds used is in the range from 8000:1 to 8:1,
is infiltrated or injected into the geological formation and,
(II) the stabilization agent is cured under elevated pressure and elevated temperature, where the stabilization agent, in the case that it is used to change the wetting behavior of the formation, also comprises an oleophobic and hydrophobic component. Comprehensive investigations have shown that these stabilization agents are not decomposed even in autoclaves at high pressure and high temperature even over a prolonged period, and also still form a stable bond under these conditions. In the case of use of a wetting-regulating stabilization agent variant, it was shown that the wetting behavior established is retained after a hydrothermal treatment in corrosive medium. The consolidation also reduces the porosity only to a slight degree.

Suitable silicon-based resins for use as the stabilization agents described herein may include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups and a silicon compound having one hydrolyzable group. Suitable polysiloxanes have a hydrosilylatable carbon-carbon unsaturated group, a hydrosilyl group (a group containing Si—H bond) and an alkoxysilyl group, and have a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the embodiments of the present disclosure may be a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group may include, but are not limited to, a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group, and the like, and any combination thereof.

The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based resins include (a) a compound comprising a reactive group of Formula I:

$$—X—SiR''_x(OR')_{3-z} \quad \text{Formula I}$$

wherein X comprises a hydrocarbon chain; wherein x=0 to 2 and z=0 to 2; wherein R' and R" comprises hydrogen, a halogen, an amide, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R" may be the same (identical) or different; and wherein when z is 0 or 1, then each R' may be the same or different; and (b) a polysiloxane comprising a reactive functional group that comprises at least one of the following structural units of Formula II:

$$R1_nR2_mSiO_{(4-n-m)/2} \quad \text{Formula II}$$

wherein R1 comprises hydrogen, hydroxyl, a hydrocarbon chain, or a siloxane chain; wherein R2 comprises a functional group; and wherein m and n fulfill the requirements of 0<n<4, 0<m<4 and 2<(m+n)<4; and wherein when n>1, then each R1 may be the same or different; and wherein when m>1, then each R2 may be the same or different. In certain embodiments, the functional group of R2 comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

Other suitable silicon-based resins may include a compound comprising an organofunctional polysiloxane polymer as a binding resin obtaining the polymeric structure as part of a curing mechanism or a combination thereof. The curing mechanism of such siloxane coatings is a two-step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen, ketoxime or acetoxy groups, but the most common is alkoxy group. Suitable such silicon-based resins comprise:

a) a polysiloxane having the following Formula III:

Formula III wherein, for each repeating polymer unit, R1, R2 and R3 are independently selected from the group consisting of alkyl, aryl, reactive glycidoxy groups having up to 20 carbon atoms, and OSi(OR5)3 groups, wherein each R5 independently has the same meaning as R1, R2 or R3, and R4 is either alkyl, aryl or hydrogen, and wherein n is selected such that the molecular weight of the polysiloxane is in the range of 500 to 2000; and, b) an organo functional silane with two hydrolysable groups having the formula wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based resins may comprise a silane coupling agent and a polymer having a reactive silicon end group. In some embodiments, these suitable silicon-based resins may also include a catalyst operable to facilitate the curing of the polymer, a diluent, a dehydrating agent, and/or a filler material. Generally, any suitable polymer that can be prepared with reactive silicon end groups may be used. Examples of suitable polymers may include, but are not limited to, a polyalkyl (e.g., polyethers, polyalkanes, polyalkenes, polyalkynes, and the like), a substituted alkyl monomer (e.g., styrene), an acrylic, and any combination thereof. Examples of suitable reactive silicon end groups may include, but are not limited to, triethoxysilanes, methyldiethoxysilanes, trisilanols, alkoxysilanes, substituted silanes, multi-silanols, and any combination thereof. One suitable polymer having a reactive silicon end group that may be used in particular embodiments of the present disclosure is a silane-modified poly(propylene oxide) oligomer.

Generally, any suitable silane coupling agent may be used in accordance with particular embodiments of the present disclosure. Examples of suitable silane coupling agents may include, but are not limited to, N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, gamma-ureidopropyl-triethoxysilanes, beta-(3-4 epoxy-cyclohexyl)-ethyl-trimethoxysilane, gamma-glycidoxypropyltrimethoxysilane, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta-(aminoethyl)-r-aminopropyl-trimethoxysilane, N-beta-(aminoethyl)-r-aminopropylmethyldimethoxysilane, 3-aminopropyl-triethoxysilane, N-phenyl-r-aminopropyltrimethoxysilane, r-mercaptopropyltrimethoxysilane, r-chloropropyltrimethoxysilane, vinyltris (beta-methoxyethoxy) silane, r-metacryloxypropyltrimethoxysilane, r-glycidoxypropyltrimethoxysilane, r-glycidoxypropylmethylidiethoxysilane, N-beta-(aminoethyl)-r-aminopropyltrimethoxysilane, N-beta-(aminoethyl)-r-aminopropylmethyldimethoxysilane, r-aminopropyltriethoxysilane, N-[3-(trimethoxysilyl)propyl]-ethylenediamine, substituted silanes where one or more of the substitutions contains a different functional group, and any combination thereof.

In some embodiments, the silane coupling agent may be present in the silicon-based resin composition in an amount of from a lower limit of about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the composition, and preferably in an amount from about 0.5% to about 3% by weight of the composition, encompassing any value and any subset therebetween.

In some embodiments, the stabilization agent may comprise a zeta potential-modifying aggregating composition, which can modify the zeta potential or aggregation potential of a proppant particulate surface. Such modifications can permit any two surfaces (e.g., of two or more proppant particulates) to have a greater attraction for one another.

Zeta potential-modifying aggregating compositions suitable for use in the embodiments of the present disclosure may include, but are not limited to, a reaction product of an amine and a phosphate ester, where the zeta potential-modifying aggregating composition is designed to coat a proppant particulate surface to change the zeta potential or aggregation potential of the surface of a proppant particulate.

Suitable amines may include, but are not limited to, any amine that is capable of reacting with a suitable phosphate ester to form a composition that forms a deformable coating on a proppant particulate surface. Exemplary examples of such amines may include, but are not limited to, any amine of the general formula R1,R2NH or mixtures or combinations thereof, where R1 and R2 are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof and where one or more of the hydrogen atoms can be replaced by one or more single valence atoms selected from the group consisting of fluorine, chlorine, bromine, iodine, and any combination thereof. Exemplary examples of amines suitable for use in the embodiments herein may include, but are not limited to, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixtures of alkyl indoles, imidazole and alkyl imidazole or mixtures of alkyl imidazole, quinoline and alkyl quinoline or mixtures of alkyl quinoline, isoquinoline and alkyl isoquinoline or mixtures of alkyl isoquinoline, pyrazine and alkyl pyrazine or mixtures of alkyl pyrazine, quinoxaline and alkyl quinoxaline or mixtures of alkyl quinoxaline, acridine and alkyl acridine or mixtures of alkyl acridine, pyrimidine and alkyl pyrimidine or mixtures of alkyl pyrimidine, quinazoline and alkyl quinazoline or mixtures of alkyl quinazoline, and any combination thereof.

Suitable phosphate esters may include, but are not limited to, any phosphate ester that is capable of reacting with a suitable amine to form a composition that forms a deformable coating on a proppant particulate surface. Exemplary examples of such phosphate esters may include, but are not limited to, any phosphate esters of the general formula $P(O)(OR3)(OR4)(OR5)$ or mixtures or combinations thereof, where R3, R4, and OR5 are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine, and any combination thereof. Exemplary examples of phosphate esters may include, but are not limited to, phosphate ester of alkanols having the general formula $P(O)(OH)x(OR6)y$ where $x+y=3$ and are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates, and any combination thereof.

Other exemplary examples of phosphate esters may include, but are not limited to, phosphate esters of alkanol amines having the general formula $N[R7OP(O)(OH)2]3$ where R7 is a carbenyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine, and any combination thereof. Other exemplary examples of phosphate esters may include, but are not limited to, phosphate esters of hydroxylated aromatics, such as phosphate esters of alkylated phenols such as nonylphenyl phosphate ester or phenolic phosphate esters. Other exemplary examples of phosphate esters may include, but are not limited to, phosphate esters of diols and polyols such as phosphate esters of ethylene glycol, propylene glycol, or higher glycolic structures. Other exemplary phosphate esters may include, but are not limited to, any phosphate ester that can react with an amine and be coated on to a proppant particulate surface that forms a deformable coating enhancing the aggregating potential of the proppant particulate surface.

In some embodiments, the stabilization agent may comprise a stabilization agent emulsion that comprises an aqueous fluid, an emulsifying agent, and a stabilization agent. The stabilization agent in suitable emulsions may be either a non-aqueous tackifying agent or a resin, such as those described above. These stabilization agent emulsions have an aqueous external phase and organic-based internal phase. The term "emulsion" and all grammatical variants thereof, as used herein, refers to a combination of two or more immiscible phases and includes, but is not limited to, dispersions and suspensions.

Suitable stabilization agent emulsions comprise an aqueous external phase comprising an aqueous fluid. Suitable aqueous fluids that may be used in the stabilization agent emulsions of the embodiments of the present disclosure include freshwater, salt water, brine, seawater, or any other aqueous fluid that, preferably, does not adversely react with the other components used in accordance with this disclosure or with the subterranean formation, including those listed above with reference to the aqueous base fluids included in the fluids described herein. One should note, however, that if long-term stability of the emulsion is desired, a more suitable aqueous fluid may be one that is substantially free of salts. It is within the ability of one skilled in the art, with the benefit of this disclosure, to determine if and how much salt may be tolerated in the stabilization agent emulsions of the embodiments of the present disclosure before it becomes problematic for the stability of the emulsion.

The aqueous fluid may be present in the stabilization agent emulsions in an amount in the range of from a lower limit of about 20%, 22%, 24%, 26%, 28%, 30%, 32%, 34%, 36%, 38%, 40%, 42%, 44%, 46%, 48%, 50%, 52%, 54%, 56%, 58%, and 60% to an upper limit of about 99.9%, 98%, 96%, 94%, 92%, 90%, 88%, 86%, 84%, 82%, 80%, 78%, 76%, 74%, 72%, 70%, 68%, 66%, 64%, 62%, and 60% by weight of the stabilization agent emulsion composition, encompassing any value and any subset therebetween. In some embodiments, the aqueous fluid may be present in the stabilization agent emulsions in an amount in the range of about 60% to 99.9% by weight of the stabilization agent emulsion composition. In other embodiments, the aqueous fluid may be present in the stabilization agent emulsions in an amount in the range of about 95% to 99.9% by weight of the stabilization agent emulsion composition.

The stabilization agent in the emulsion may be either a non-aqueous tackifying agent or a resin, such as those described above. The stabilization agents may be present in a stabilization agent emulsion in an amount in the range of from a lower limit of about 0.1%, 1%, 5%, 10%, 15%, 20%, 25%, 30%, 35%, and 40% to an upper limit about 80%, 75%, 70%, 65%, 60%, 55%, 50%, 45%, and 40% by weight of the stabilization agent emulsion composition, encompassing any value and any subset therebetween. In some embodiments, the stabilization agent may be present in a stabilization agent emulsion in an amount in the range of about 0.1% to about 40% by weight of the composition. In some embodiments, the stabilization agent may be present in a stabilization agent emulsion in an amount in the range of about 0.1% to about 5% by weight of the composition.

In certain embodiments, the stabilization agent emulsions may further comprise an emulsifying agent. Examples of suitable emulsifying agents may include, but are not limited to, surfactants, proteins, hydrolyzed proteins, lipids, glycolipids, and nano-sized particulates, including, but not limited to, fumed silica. Combinations of these may be suitable as well.

In some embodiments, the stabilization agent may also comprise an optional catalyst to facilitate curing. Generally, any suitable catalyst may be used with the stabilization agent described herein. Examples of suitable catalysts may include, but are not limited to, tertiary amine catalysts, titanium chelate catalysts, tin catalysts, lead catalysts, bismuth catalysts, and any combination thereof. One suitable catalyst that may be used in particular embodiments of the present disclosure is dibutylbis(2,4-pentanedionate-O,O')—, (OC-6-11). In some embodiments, the catalyst may be present in an amount from about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the stabilization agent, and preferably in an amount from about 1% to about 3% by weight of the composition, encompassing any value and any subset therebetween.

In various embodiments, systems configured for delivering the fracturing fluids, proppant-free fluids, and proppant fluids (collectively referred to simply as "fluids") described herein to a downhole location are described. In various embodiments, the systems may comprise a pump fluidly coupled to a pipe conveyance, the interior of the pipe conveyance containing one or more fluids described herein, and an annulus formed between the pipe conveyance and the formation, the annulus containing one or more of a different fluid described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying the proppant particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the pipe conveyance. That is, in such embodiments, the low pressure pump may be configured to convey the fluids to the high pressure pump. In such embodiments, the low pressure pump may "step up" the pressure of the fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the pipe conveyance or the annulus. In other embodiments, however, the fluids may be formulated offsite and transported to a worksite, in which case the fluids may be introduced to the pipe conveyance or the annulus via the pump directly from its shipping container (e.g., a truck, a railcar, a barge, or the like) or from a transport pipeline. In either case, the fluids may be drawn into the pump, elevated to an appropriate pressure, and then introduced into the pipe conveyance or annulus for delivery downhole.

FIG. 1 shows an illustrative schematic of a system that can deliver the fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the fluids of the embodiments herein may be formulated. The fluids may be conveyed via line 12 to wellhead 14, where the fluids enter pipe conveyance 16, pipe conveyance 16 extending from wellhead 14 into subterranean formation 18, and the exterior of the pipe conveyance 16 and the subterranean formation 18 forming an annulus 21. Upon being ejected from pipe conveyance 16, the fluids may subsequently penetrate into subterranean formation 18. Pump 20 may be configured to raise the pressure of the fluids to a desired degree before introduction into pipe conveyance 16. Although not depicted, another pump may be located in the system 1 of FIG. 1 to convey fluids to the annulus 21 simultaneously with the conveyance of fluids through the pipe conveyance 16, as shown in greater detail in FIG. 2.

It is to be recognized that system 1 is merely exemplary in nature and various additional components may be present that have not necessarily been depicted in FIG. 1 in the interest of clarity. Non-limiting additional components that may be present include, but are not limited to, additional pumps, tubulars, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid may, in some embodiments, flow back to wellhead 14 and exit subterranean formation 18 (e.g., the broken proppant-free fluid described herein). In some embodiments, the fluid that has flowed back to wellhead 14 may subsequently be recovered and recirculated to subterranean formation 18 or otherwise used for other subterranean formation operations, with or without reformulation of the fluids.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Figure 2:
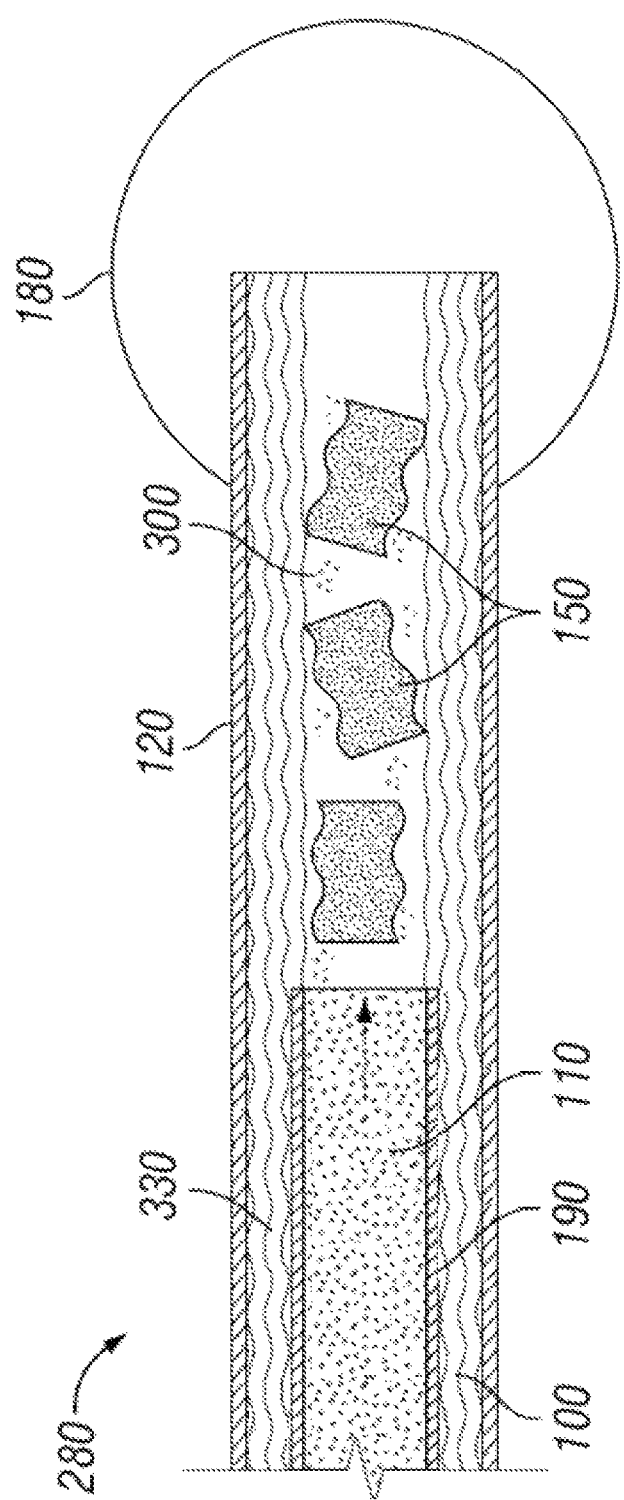
FIG. 2 shows a sagittal, detailed schematic view of the mechanism by which the proppant-free fluid and the proppant fluid are simultaneously introduced into a wellbore, wherein proppant particulate clusters are formed because the two fluids are substantially immiscible.

Referring now to FIG. 2, illustrated is a sagittal, detailed schematic view of the mechanism 280 by which the proppant-free fluid and the proppant fluid are simultaneously introduced into a wellbore, wherein proppant clusters are formed by the substantial immiscibility of the two fluids. FIG. 1B shows a subterranean formation 120 comprising a pipe conveyance 190. The subterranean formation 120 and the exterior of the pipe conveyance 190 form an annulus 330. As shown, the proppant fluid 110 is pumped through the interior of the pipe conveyance 190 simultaneously with the proppant-free fluid 100, which is pumped through the annulus 330 at a pump rate slower than the pump rate of the proppant fluid 110. The proppant fluid 110 and the proppant-free fluid 100 are substantially immiscible and the substantial immiscibility of the two fluids may cause the proppant particulates 300 to form proppant particulate clusters 150 in the proppant fluid. In some instances, individual proppant particulates 300 may also remain in the proppant fluid, without departing from the scope of the present disclosure.

Embodiments disclosed herein include:

Embodiment A: A method comprising: providing a fracturing fluid comprising a first base fluid and a first gelling agent; providing proppant-free fluid comprising a second base fluid and a second gelling agent; providing a proppant fluid comprising a third base fluid, a third gelling agent, and proppant particulates, wherein the proppant-free fluid and the proppant fluid are substantially immiscible; pumping the fracturing fluid through an annulus formed between a subterranean formation and a pipe conveyance at a rate above a fracture gradient of the subterranean formation to create and/or open at least one fracture in the subterranean formation; continuously pumping the proppant-free fluid into the subterranean formation through the annulus at a first rate to extend the open fracture; continuously pumping the proppant fluid through an interior of the pipe conveyance and out an exit of the interior of the pipe conveyance at a second rate that is less than the first rate, wherein the proppant fluid and the proppant-free fluid are present simultaneously in a portion of the subterranean formation but remain substantially immiscible; and placing the proppant particulates into a portion of a fracture in the subterranean formation so as to form a proppant pack having proppant-free channels therein.

Embodiment A may have one or more of the following additional elements in any combination:

Element A1: Wherein the first rate is above the fracture gradient pressure of the subterranean formation.

Element A2: Wherein the fracturing fluid further comprises proppant particulates having a size selected from the group consisting of micro-sized, nano-sized, and any combination thereof.

Element A3: Wherein the continuous pumping of the proppant-free fluid and the continuous pumping of the proppant fluid is ceased after the proppant pack having proppant-free channels is formed in the fracture, or if an increase in treating pressure is observed above a threshold treating pressure.

Element A4: Wherein the proppant-free fluid is hydrophilic and the proppant fluid is hydrophobic, thereby causing the proppant-free fluid and the proppant fluid to be substantially immiscible, or wherein the proppant-free fluid is hydrophobic and the proppant fluid is hydrophilic, thereby causing the proppant-free fluid and the proppant fluid to be substantially immiscible.

Element A5: Wherein a viscosity of the proppant-free fluid is at least about 50% greater than a viscosity of the proppant fluid, thereby causing the proppant-free fluid and the proppant fluid to be substantially immiscible.

Element A6: Wherein the proppant-free fluid is a linear fluid and the proppant fluid is a macromolecularly structured fluid, thereby causing the proppant-free fluid and the proppant fluid to be substantially immiscible, or wherein the proppant-free fluid is a macromolecularly structured fluid and the proppant fluid is a linear fluid, thereby causing the proppant-free fluid and the proppant fluid to be substantially immiscible.

Element A7: Wherein the proppant-free fluid is a linear fluid and the proppant fluid is a foamed fluid, thereby causing the proppant-free fluid and the proppant fluid to be substantially immiscible, or wherein the proppant-free fluid is a foamed fluid and the proppant fluid is a linear fluid, thereby causing the proppant-free fluid and the proppant fluid to be substantially immiscible.

Element A8: Wherein the proppant particulates comprise proppant particulates with at least a portion thereof coated with a stabilization agent selected from the group consisting of a non-aqueous tackifying agent, an aqueous tackifying agent, a silyl-modified polyamide compound, a curable resin, a crosslinkable aqueous polymer composition, a polymerizable organic monomer composition, a zeta potential-modifying aggregating composition, a silicon-based resin, a binder, a stabilization agent emulsion, and any combination thereof.

By way of non-limiting example, exemplary combinations applicable to A include: A with A1 and A2, A with A3, A5, and A8; A with A1, A2, A3, A4, A5, A6, A7, and A8; A with A4, A5, and A7; A with A1, A3, and A6; A with A2, A4, A6, and A8; and the like.

Embodiment B: A method comprising: providing a fracturing fluid comprising a first base fluid and a first gelling agent; providing proppant-free fluid comprising a second base fluid, a second gelling agent, and a breaker; providing a proppant fluid comprising a third base fluid, a third gelling agent, and proppant particulates, wherein the proppant-free fluid and the proppant fluid are substantially immiscible; pumping the fracturing fluid through an annulus formed between a subterranean formation and a pipe conveyance at a rate above the fracture gradient to create and/or open at least one fracture in the subterranean formation; continuously pumping the proppant-free fluid into the subterranean formation through the annulus at a first rate to extend the open fracture; continuously pumping the proppant fluid through an interior of the pipe conveyance and out an exit of the interior of the pipe conveyance at a second rate that is less than the first rate, wherein the proppant fluid and the proppant-free fluid are present simultaneously in a portion of the subterranean formation but remain substantially immiscible; placing the proppant particulates into a portion of a fracture in the subterranean formation so as to form a proppant pack having proppant-free channels therein; activating the breaker in the proppant-free fluid; and removing at least a portion of the proppant-free fluid from the subterranean formation.

Embodiment B may have one or more of the following additional elements in any combination:

Element B1: Wherein the first rate is above the fracture gradient pressure of the subterranean formation.

Element B2: Wherein the fracturing fluid further comprises proppant particulates having a size selected from the group consisting of micro-sized, nano-sized, and any combination thereof.

Element B3: Wherein the continuous pumping of the proppant-free fluid and the continuous pumping of the proppant fluid is ceased after the proppant pack having proppant-free channels is formed in the fracture, or if an increase in treating pressure is observed above a threshold treating pressure.

Element B4: Wherein the proppant-free fluid is hydrophilic and the proppant fluid is hydrophobic, thereby causing the proppant-free fluid and the proppant fluid to be substantially immiscible, or wherein the proppant-free fluid is hydrophobic and the proppant fluid is hydrophilic, thereby causing the proppant-free fluid and the proppant fluid to be substantially immiscible.

Element B5: Wherein a viscosity of the proppant-free fluid is at least about 50% greater than a viscosity of the proppant fluid, thereby causing the proppant-free fluid and the proppant fluid to be substantially immiscible.

Element B6: Wherein the proppant-free fluid is a linear fluid and the proppant fluid is a macromolecularly structured fluid, thereby causing the proppant-free fluid and the proppant fluid to be substantially immiscible, or wherein the proppant-free fluid is a macromolecularly structured fluid and the proppant fluid is a linear fluid, thereby causing the proppant-free fluid and the proppant fluid to be substantially immiscible.

Element B7: Wherein the proppant-free fluid is a linear fluid and the proppant fluid is a foamed fluid, thereby causing the proppant-free fluid and the proppant fluid to be substantially immiscible, or wherein the proppant-free fluid is a foamed fluid and the proppant fluid is a linear fluid, thereby causing the proppant-free fluid and the proppant fluid to be substantially immiscible.

Element B8: Wherein the proppant particulates comprise proppant particulates with at least a portion thereof coated with a stabilization agent selected from the group consisting of a non-aqueous tackifying agent, an aqueous tackifying agent, a silyl-modified polyamide compound, a curable resin, a crosslinkable aqueous polymer composition, a polymerizable organic monomer composition, a zeta potential-modifying aggregating composition, a silicon-based resin, a binder, a stabilization agent emulsion, and any combination thereof.

Element B9: Wherein the breaker is encapsulated in an encapsulating material.

By way of non-limiting example, exemplary combinations applicable to B include: B with B1, B3, and B5; B with B2, B3, B5, and B9; B with B1, B2, B3, B4, B5, B6, B7, B8, and B9; B with B7 and B9; B with B4, B5, B7, and B8; and the like.

Embodiment C: A system comprising: a pipe conveyance extending into a subterranean formation, the pipe conveyance having an exterior and an interior, the interior having an exit, wherein an annulus is formed between the exterior of the pipe conveyance and the subterranean formation; a flowing proppant fluid in the interior of the pipe conveyance, the flowing proppant fluid comprising a first base fluid, a first gelling agent, and proppant particulates, a flowing proppant-free fluid in the annulus, the flowing proppant-free fluid comprising a second base fluid, a second gelling agent, and proppant particulates, and wherein the proppant fluid is flowing at a first rate and the proppant-free fluid is flowing at a second rate that is less than the first rate.

Embodiment C may have one or more of the following additional elements in any combination:

Element C1: Wherein the first rate is above the fracture gradient pressure of the subterranean formation.

Element C2: Wherein the fracturing fluid further comprises proppant particulates having a size selected from the group consisting of micro-sized, nano-sized, and any combination thereof.

Element C3: Wherein the proppant-free fluid is hydrophilic and the proppant fluid is hydrophobic, thereby causing the proppant-free fluid and the proppant fluid to be substantially immiscible, or wherein the proppant-free fluid is hydrophobic and the proppant fluid is hydrophilic, thereby causing the proppant-free fluid and the proppant fluid to be substantially immiscible.

Element C4: Wherein a viscosity of the proppant-free fluid is at least about 50% greater than a viscosity of the proppant fluid, thereby causing the proppant-free fluid and the proppant fluid to be substantially immiscible.

Element C5: Wherein the proppant-free fluid is a linear fluid and the proppant fluid is a macromolecularly structured fluid, thereby causing the proppant-free fluid and the proppant fluid to be substantially immiscible, or wherein the proppant-free fluid is a macromolecularly structured fluid and the proppant fluid is a linear fluid, thereby causing the proppant-free fluid and the proppant fluid to be substantially immiscible.

Element C6: Wherein the proppant-free fluid is a linear fluid and the proppant fluid is a foamed fluid, thereby causing the proppant-free fluid and the proppant fluid to be substantially immiscible, or wherein the proppant-free fluid is a foamed fluid and the proppant fluid is a linear fluid, thereby causing the proppant-free fluid and the proppant fluid to be substantially immiscible.

Element C7: Wherein the proppant particulates comprise proppant particulates with at least a portion thereof coated with a stabilization agent selected from the group consisting of a non-aqueous tackifying agent, an aqueous tackifying agent, a silyl-modified polyamide compound, a curable resin, a crosslinkable aqueous polymer composition, a polymerizable organic monomer composition, a zeta potential-modifying aggregating composition, a silicon-based resin, a binder, a stabilization agent emulsion, and any combination thereof.

Element C8: Wherein the proppant-free fluid further comprises a breaker.

Element C9: Wherein the proppant-free fluid further comprises a breaker encapsulated in an encapsulating material.

By way of non-limiting example, exemplary combinations applicable to C include: C with C1 and C3; C with C4, C6, and C9; C with C1, C2, C3, C4, C5, C6, C7, C8, and C9; C with C3, C5, C7, and C9; C with C2, C4, C6, and C8; C with C3, C4, C5, and C9; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   providing a fracturing fluid comprising a first base fluid and a first gelling agent;
   providing a proppant-free fluid comprising a second base fluid and a second gelling agent;
   providing a proppant fluid comprising a third base fluid, a third gelling agent, and proppant particulates,
      wherein the proppant-free fluid and the proppant fluid are substantially immiscible;
   pumping the fracturing fluid through an annulus formed between a subterranean formation and a pipe conveyance extending into the subterranean formation at a rate above a fracture gradient of the subterranean formation to create and/or open at least one fracture in the subterranean formation;
   continuously pumping the proppant-free fluid into the subterranean formation through the annulus at a first rate to extend the open fracture;
   continuously pumping the proppant fluid through an interior of the pipe conveyance and out an exit of the interior of the pipe conveyance at a second rate that is less than the first rate,
      wherein the proppant fluid and the proppant-free fluid are present simultaneously in a portion of the subterranean formation but remain substantially immiscible; and
   upon exiting the pipe conveyance, shearing off the proppant fluid by the proppant-free fluid thereby placing the proppant particulates into a portion of a fracture in the subterranean formation so as to form a proppant pack having proppant-free channels therein.

2. The method of claim 1, wherein the first rate is above the fracture gradient pressure of the subterranean formation.

3. The method of claim 1, wherein the fracturing fluid further comprises proppant particulates having a size selected from the group consisting of micro-sized, nano-sized, and any combination thereof.

4. The method of claim 1, wherein the continuous pumping of the proppant-free fluid and the continuous pumping of the proppant fluid is ceased after the proppant pack having proppant-free channels is formed in the fracture, or if an increase in treating pressure is observed above a threshold treating pressure.

5. The method of claim 1, wherein the proppant-free fluid is hydrophilic and the proppant fluid is hydrophobic, thereby causing the proppant-free fluid and the proppant fluid to be substantially immiscible, or wherein the proppant-free fluid is hydrophobic and the proppant fluid is hydrophilic, thereby causing the proppant-free fluid and the proppant fluid to be substantially immiscible.

6. The method of claim 1, wherein a viscosity of the proppant-free fluid is at least about 50% greater than a viscosity of the proppant fluid, thereby causing the proppant-free fluid and the proppant fluid to be substantially immiscible.

7. The method of claim 1, wherein the proppant-free fluid is a linear fluid and the proppant fluid is a macromolecularly structured fluid, thereby causing the proppant-free fluid and the proppant fluid to be substantially immiscible, or
wherein the proppant-free fluid is a macromolecularly structured fluid and the proppant fluid is a linear fluid, thereby causing the proppant-free fluid and the proppant fluid to be substantially immiscible.

8. The method of claim 1, wherein the proppant-free fluid is a linear fluid and the proppant fluid is a foamed fluid, thereby causing the proppant-free fluid and the proppant fluid to be substantially immiscible, or
wherein the proppant-free fluid is a foamed fluid and the proppant fluid is a linear fluid, thereby causing the proppant-free fluid and the proppant fluid to be substantially immiscible.

9. The method of claim 1, wherein the proppant particulates comprise proppant particulates with at least a portion thereof coated with a stabilization agent selected from the group consisting of a non-aqueous tackifying agent, an aqueous tackifying agent, a silyl-modified polyamide compound, a curable resin, a crosslinkable aqueous polymer composition, a polymerizable organic monomer composition, a zeta potential-modifying aggregating composition, a silicon-based resin, a binder, a stabilization agent emulsion, and any combination thereof.

10. A method comprising:
providing a fracturing fluid comprising a first base fluid and a first gelling agent;
providing a proppant-free fluid comprising a second base fluid, a second gelling agent, and a breaker;
providing a proppant fluid comprising a third base fluid, a third gelling agent, and proppant particulates,
wherein the proppant-free fluid and the proppant fluid are substantially immiscible;
pumping the fracturing fluid through an annulus formed between a subterranean formation and a pipe conveyance extending into the subterranean formation at a rate above the fracture gradient to create and/or open at least one fracture in the subterranean formation;
continuously pumping the proppant-free fluid into the subterranean formation through the annulus at a first rate to extend the open fracture;
continuously pumping the proppant fluid through an interior of the pipe conveyance and out an exit of the interior of the pipe conveyance at a second rate that is less than the first rate,
wherein the proppant fluid and the proppant-free fluid are present simultaneously in a portion of the subterranean formation but remain substantially immiscible;
upon exiting the pipe conveyance, shearing off the proppant fluid by the proppant-free fluid thereby placing the proppant particulates into a portion of a fracture in the subterranean formation so as to form a proppant pack having proppant-free channels therein;
activating the breaker in the proppant-free fluid; and
removing at least a portion of the proppant-free fluid from the subterranean formation.

11. The method of claim 10, wherein the first rate is above the fracture gradient pressure of the subterranean formation.

12. The method of claim 10, wherein the fracturing fluid further comprises proppant particulates having a size selected from the group consisting of micro-sized, nano-sized, and any combination thereof.

13. The method of claim 10, wherein the continuous pumping of the proppant-free fluid and the continuous pumping of the proppant fluid is ceased after the proppant pack having proppant-free channels is formed in the fracture, or if an increase in treating pressure is observed.

14. The method of claim 10, wherein the proppant particulates comprise proppant particulates with at least a portion thereof coated with a stabilization agent selected from the group consisting of a non-aqueous tackifying agent, an aqueous tackifying agent, a silyl-modified polyamide compound, a curable resin, a crosslinkable aqueous polymer composition, a polymerizable organic monomer composition, a zeta potential-modifying aggregating composition, a silicon-based resin, a binder, a stabilization agent emulsion, and any combination thereof.

15. The method of claim 10, wherein the breaker is encapsulated in an encapsulating material.

16. The method of claim 10, wherein the proppant-free fluid is a linear fluid and the proppant fluid is a macromolecularly structured fluid, thereby causing the proppant-free fluid and the proppant fluid to be substantially immiscible, or
wherein the proppant-free fluid is a macromolecularly structured fluid and the proppant fluid is a linear fluid, thereby causing the proppant-free fluid and the proppant fluid to be substantially immiscible.

17. The method of claim 10, wherein the proppant-free fluid is a linear fluid and the proppant fluid is a foamed fluid, thereby causing the proppant-free fluid and the proppant fluid to be substantially immiscible, or
wherein the proppant-free fluid is a foamed fluid and the proppant fluid is a linear fluid, thereby causing the proppant-free fluid and the proppant fluid to be substantially immiscible.

18. A system comprising:
a pipe conveyance extending into a subterranean formation, the pipe conveyance having an exterior and an interior, the interior having an exit,
wherein an annulus is formed between the exterior of the pipe conveyance and the subterranean formation;
a flowing proppant fluid in the interior of the pipe conveyance, the flowing proppant fluid comprising a first base fluid, a first gelling agent, and proppant particulates, and
a flowing proppant-free fluid in the annulus, the flowing proppant-free fluid comprising a second base fluid and a second gelling agent,
wherein the proppant-free fluid is flowing at a first rate and the proppant fluid is flowing at a second rate that is less than the first rate and the proppant fluid is sheared off by the proppant-free fluid.

19. The system of claim 18, wherein the proppant-free fluid is a linear fluid and the proppant fluid is a macromolecularly structured fluid, thereby causing the proppant-free fluid and the proppant fluid to be substantially immiscible, or
wherein the proppant-free fluid is a macromolecularly structured fluid and the proppant fluid is a linear fluid, thereby causing the proppant-free fluid and the proppant fluid to be substantially immiscible.

20. The system of claim 18, wherein the proppant-free fluid is a linear fluid and the proppant fluid is a foamed fluid, thereby causing the proppant-free fluid and the proppant fluid to be substantially immiscible, or
   wherein the proppant-free fluid is a foamed fluid and the proppant fluid is a linear fluid, thereby causing the proppant-free fluid and the proppant fluid to be substantially immiscible.

* * * * *